US011983829B2

(12) United States Patent
Tsuda et al.

(10) Patent No.: US 11,983,829 B2
(45) Date of Patent: May 14, 2024

(54) NON-TRANSITORY COMPUTER READABLE MEDIUM INCLUDING AUGMENTED REALITY PROCESSING PROGRAM AND AUGMENTED REALITY PROCESSING SYSTEM

(71) Applicant: SQUARE ENIX CO., LTD., Tokyo (JP)

(72) Inventors: Makoto Tsuda, Tokyo (JP); Keita Shibata, Tokyo (JP); Manami Fushiki, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 17/584,656

(22) Filed: Jan. 26, 2022

(65) Prior Publication Data

US 2022/0237877 A1    Jul. 28, 2022

(30) Foreign Application Priority Data

Jan. 27, 2021   (JP) ................................ 2021-011471
Nov. 30, 2021   (JP) ................................ 2021-193966

(51) Int. Cl.
*G06T 19/00*    (2011.01)
*G06F 3/01*     (2006.01)

(52) U.S. Cl.
CPC ............ *G06T 19/006* (2013.01); *G06F 3/016* (2013.01)

(58) Field of Classification Search
None
See application file for complete search history.

(56) References Cited

U.S. PATENT DOCUMENTS

2013/0335454 A1* 12/2013 Birnbaum ............. A63F 13/212
                                                  345/173
2017/0063611 A1*  3/2017 Sheba ................. H04L 41/0803
2021/0350634 A1* 11/2021 Major ..................... G06T 17/00

FOREIGN PATENT DOCUMENTS

JP        2020204989 A      12/2020
WO   WO-2021059359 A1 *   9/2019   ............... G06F 3/02

\* cited by examiner

*Primary Examiner* — Tapas Mazumder
(74) *Attorney, Agent, or Firm* — Dorsey & Whitney LLP

(57) ABSTRACT

A non-transitory computer readable medium including an augmented reality processing program causing a server to implement a controllable object display data output function of outputting display data for displaying, in a superimposed manner on a real space, a controllable object that is a virtual object controllable by a user, and a controllable object control function of controlling at least one of an operation, movement, and a state change of the controllable object in accordance with an operation input provided by the user.

13 Claims, 17 Drawing Sheets

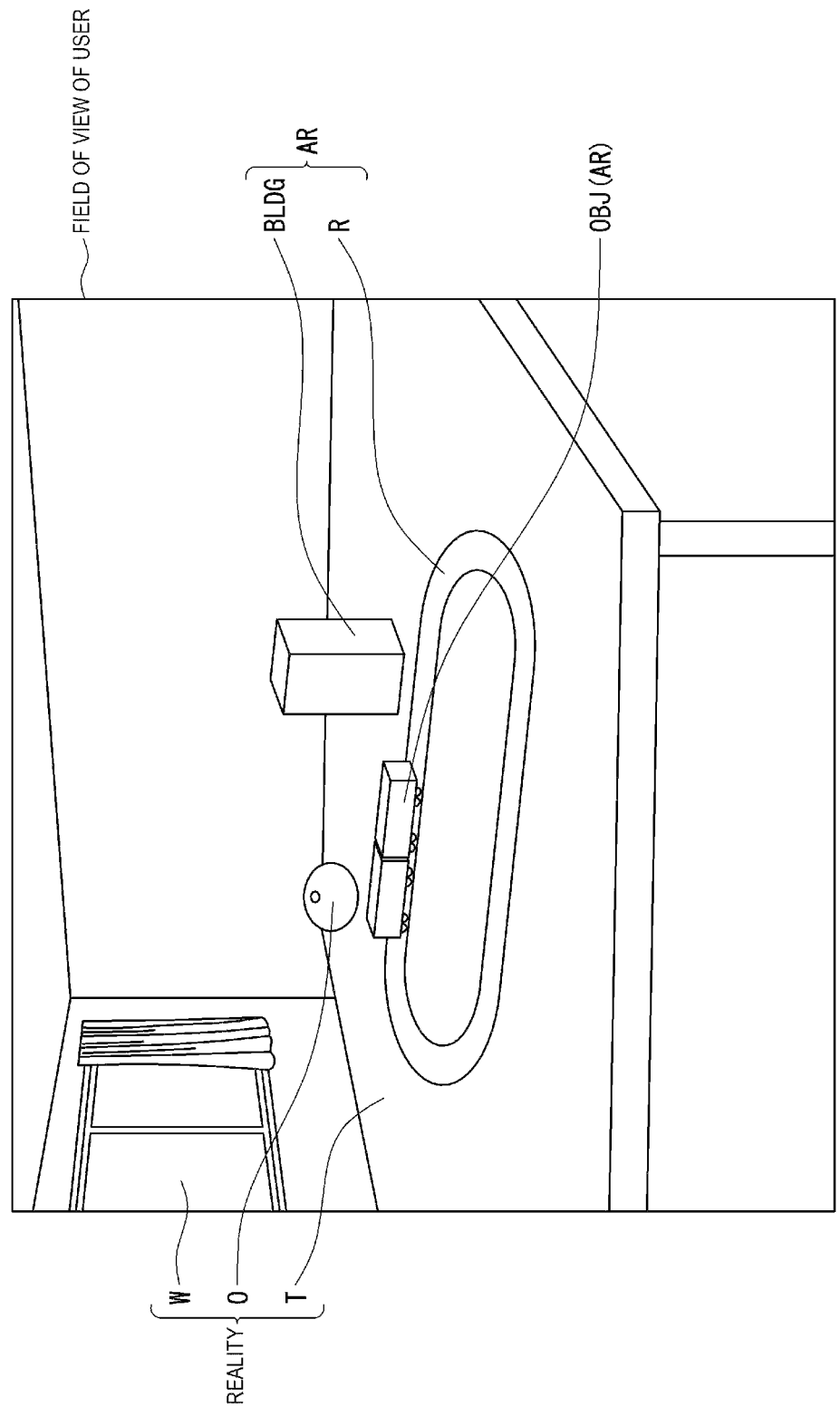

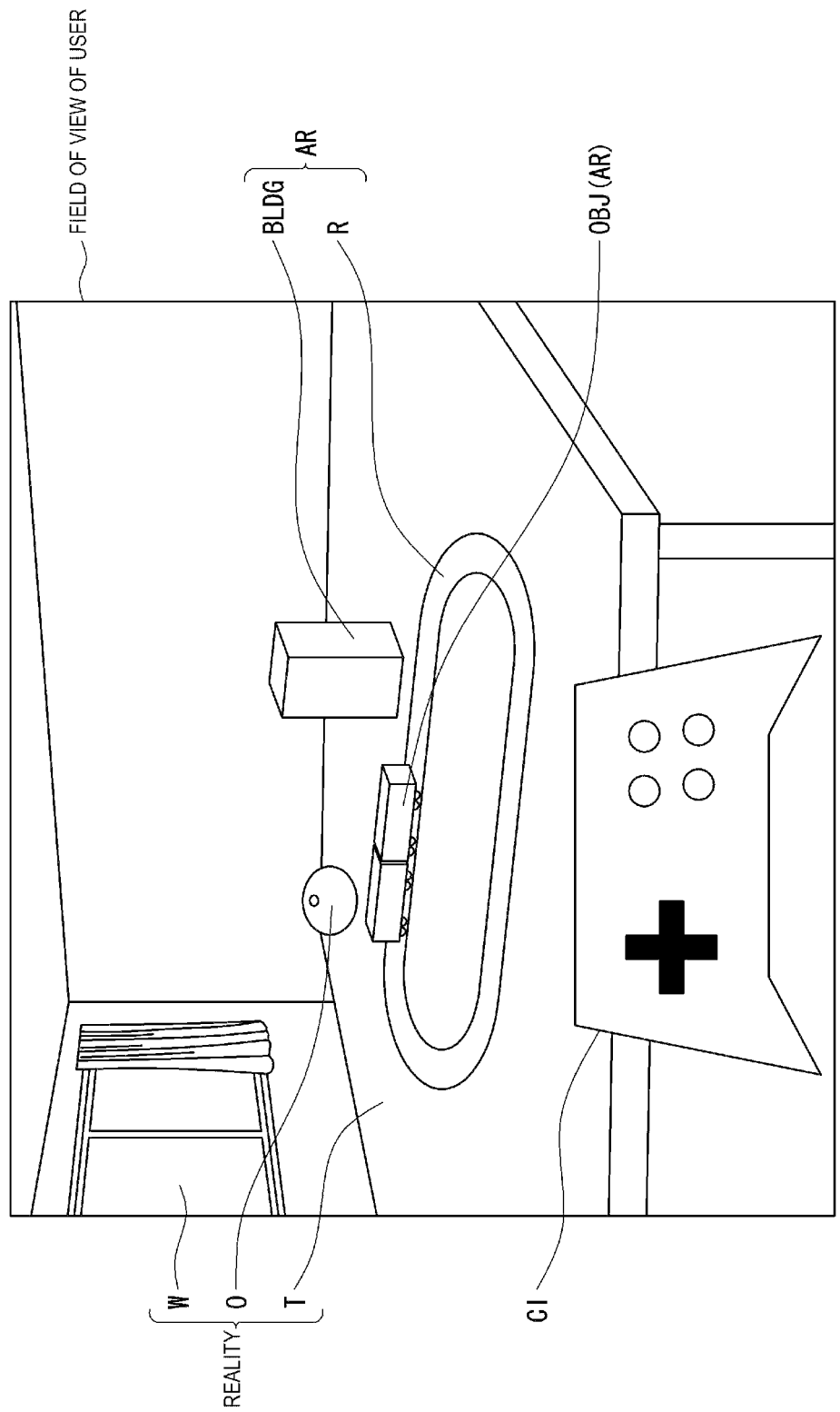

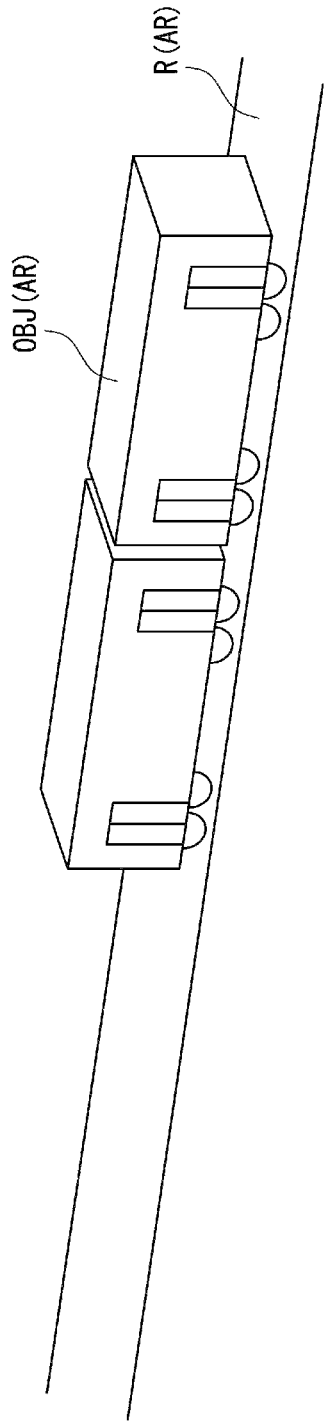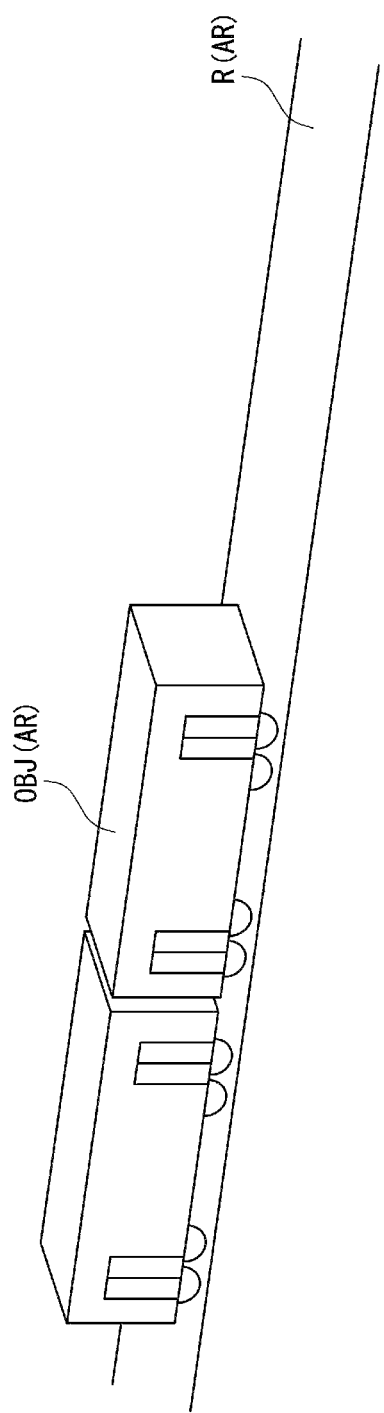

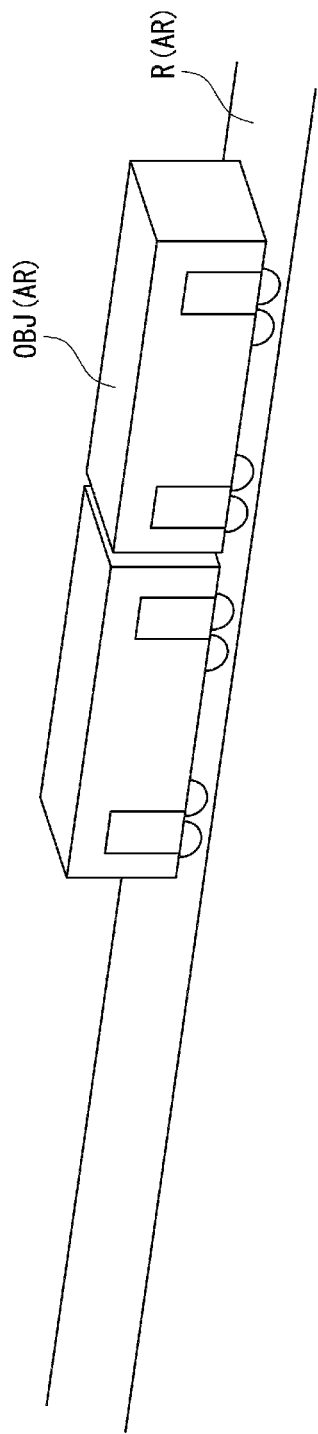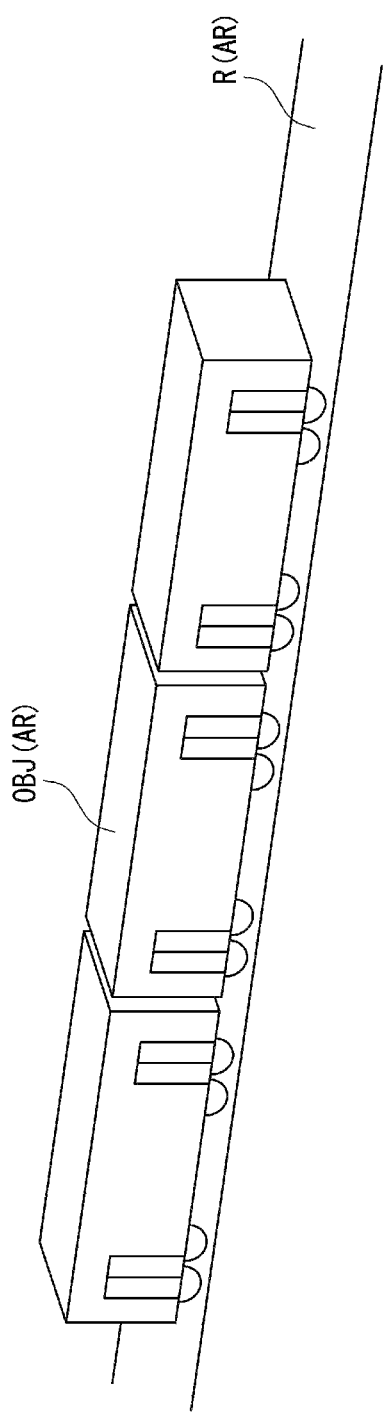

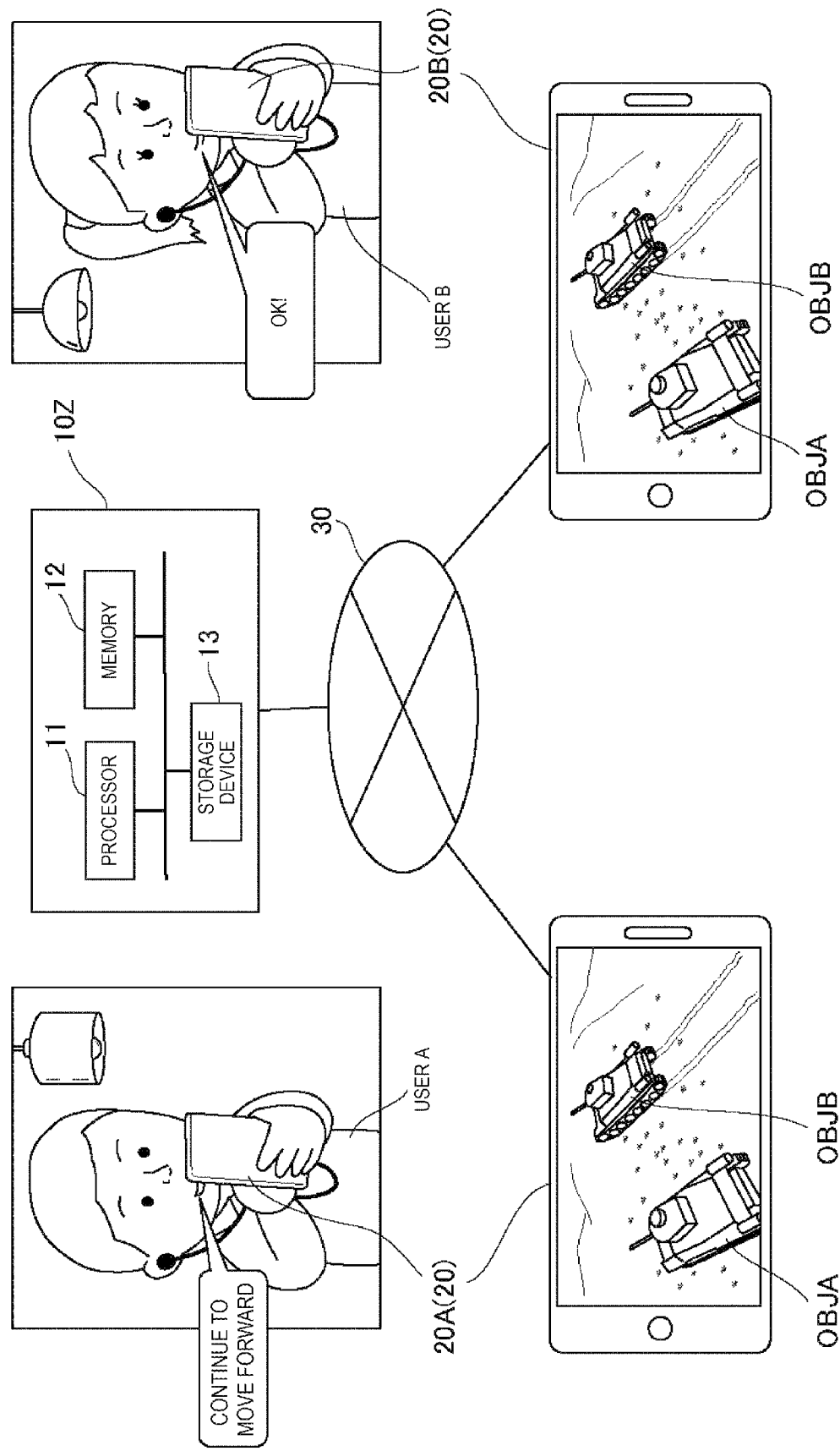

NON-TRANSITORY COMPUTER READABLE MEDIUM INCLUDING AUGMENTED REALITY PROCESSING PROGRAM AND AUGMENTED REALITY PROCESSING SYSTEM

CROSS-REFERENCE TO RELATED APPLICATION(S)

This application claims priority to and the benefit of Japanese Patent Application No. 2021-011471, filed on Jan. 27, 2021, and Japanese Patent Application No. 2021-193966, filed on Nov. 30, 2021, the disclosure of which are expressly incorporated herein by reference in its entirety for any purpose.

BACKGROUND

At least one embodiment of the present disclosure relates to a non-transitory computer readable medium including an augmented reality processing program and an augmented reality processing system.

An apparatus that outputs an augmented reality (AR) object to a user using AR technology is known.

For example, JP-A-2020-204989 discloses an information processing apparatus including a positional information acquisition unit that acquires positional information indicating a position of an AR apparatus which outputs an AR object seen as if being present in a real space using AR technology, a weight calculation unit that calculates a weight of a shift which is an evaluation value indicating how likely is occurrence of a shift in arrangement position of the AR object to be recognized by a plurality of users, based on the positional information of a plurality of the AR apparatuses and the arrangement position of the AR object, and an adjustment unit that adjusts a method of outputting the AR object in accordance with the weight of the shift such that the occurrence of the shift is unlikely to be recognized.

SUMMARY

An object (AR object) superimposed on the real space is not present in the real space as an object. However, in a case where the user can control the object, interest of the user is improved.

An object of at least one embodiment of the present disclosure is to solve the above problem and improve interest of a user.

From a non-limiting viewpoint, a non-transitory computer readable medium including an augmented reality processing program according to one embodiment of the present disclosure causes a server to implement a controllable object display data output function of outputting display data for displaying, in a superimposed manner on a real space, a controllable object that is a virtual object controllable by a user, and a controllable object control function of controlling at least one of an operation, movement, and a state change of the controllable object in accordance with an operation input provided by the user.

From a non-limiting viewpoint, an augmented reality processing system according to one embodiment of the present disclosure includes a communication network, a server, a user terminal, and a display device, and the augmented reality processing system includes controllable object display data output means for outputting display data for displaying, in a superimposed manner on a real space, a controllable object that is a virtual object controllable by a user, display data display means for displaying the display data on the display device, and controllable object control means for controlling at least one of an operation, movement, and a state change of the controllable object in accordance with an operation input provided by the user.

From a non-limiting viewpoint, a non-transitory computer readable medium including an augmented reality processing program according to one embodiment of the present disclosure causes a user terminal to implement a controllable object display data output function of outputting display data for displaying, in a superimposed manner on a real space, a controllable object that is a virtual object controllable by a user, a display data display function of displaying the display data on a display device, and a controllable object control function of controlling at least one of an operation, movement, and a state change of the controllable object in accordance with an operation input provided by the user.

Each embodiment of the present application solves one or two or more deficiencies.

BRIEF DESCRIPTION OF THE DRAWINGS

FIG. 16 is a diagram illustrating a display example by the display device according to at least one embodiment of the present disclosure.

FIG. 17 is a diagram illustrating a display example by the display device according to at least one embodiment of the present disclosure.

FIG. 18A is a conceptual diagram illustrating an example of a movement control of a controllable object according to at least one embodiment of the present disclosure.

FIG. 18B is a conceptual diagram illustrating an example of the movement control of the controllable object according to at least one embodiment of the present disclosure.

FIG. 19 is a conceptual diagram illustrating an example of an operation control of the controllable object according to at least one embodiment of the present disclosure.

FIG. 20 is a conceptual diagram illustrating an example of a state change control of the controllable object according to at least one embodiment of the present disclosure.

FIG. 22 is a conceptual diagram illustrating inter-apparatus communication according to at least one embodiment of the present disclosure.

DETAILED DESCRIPTION

Hereinafter, an example of embodiments of the present disclosure will be described with reference to the drawings. Various constituents in the example of each embodiment described below can be appropriately combined without contradiction or the like. In addition, contents described as an example of a certain embodiment may not be described in other embodiments. In addition, contents of operations or processes not related to a characteristic part of each embodiment may be omitted. Furthermore, an order of various processes constituting various flows or sequences described below may be changed without contradiction or the like in process contents.

First Embodiment

A summary of a first embodiment of the present disclosure will be described. Hereinafter, an augmented reality processing program executed in a server will be illustratively described as the first embodiment.

Figure 1:
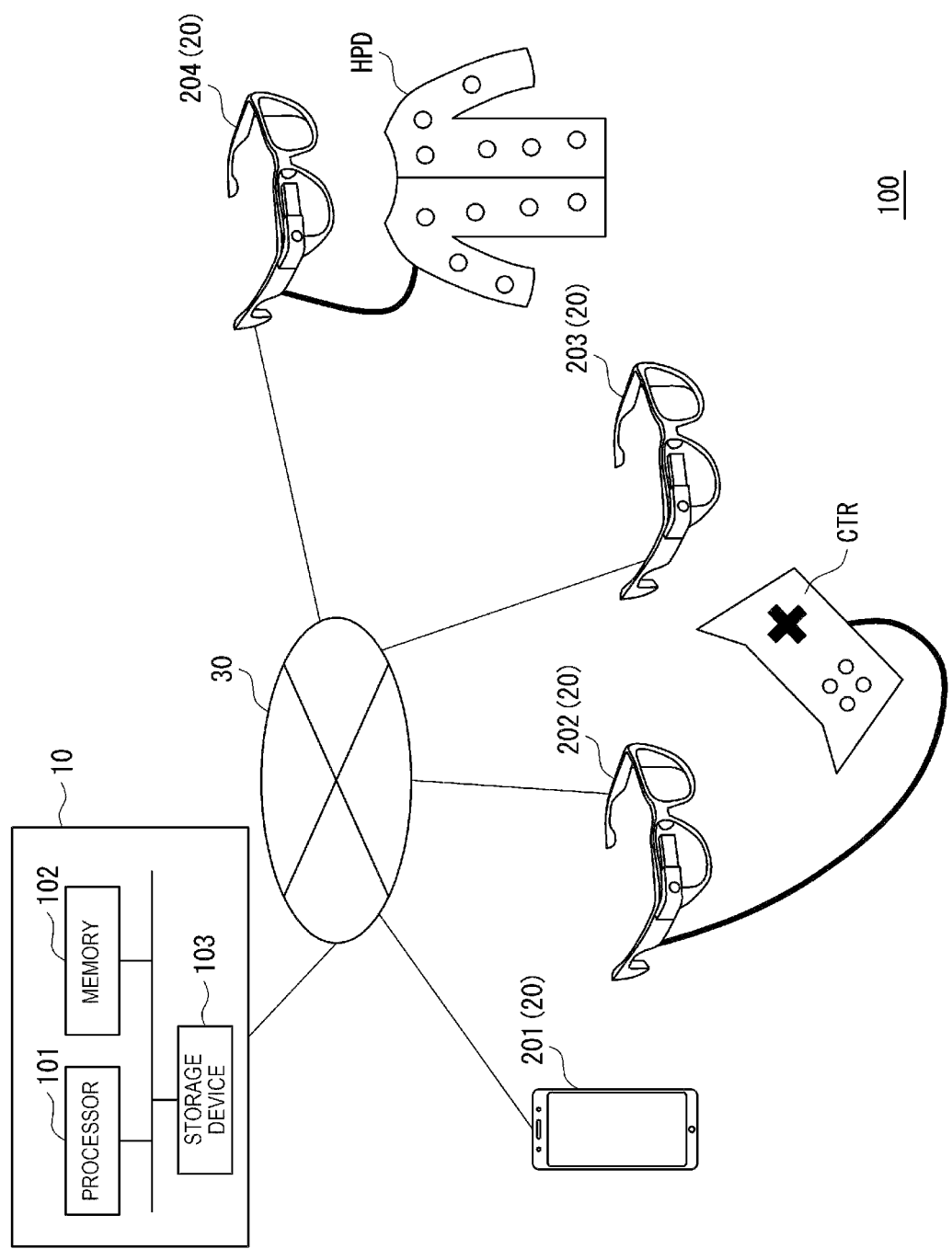
FIG. 1 is a diagram illustrating an example of a configuration of an augmented reality processing system according to at least one embodiment of the present disclosure.

FIG. 1 is a diagram illustrating an example of a configuration of an augmented reality processing system according to at least one embodiment of the present disclosure. An augmented reality processing system 100 includes an augmented reality processing server 10 (server 10) and a user terminal 20 used by a user of the augmented reality processing system 100. Each of user terminals 201, 202, 203, and 204 is an example of the user terminal 20. The configuration of the augmented reality processing system 100 is not limited thereto. For example, the augmented reality processing system 100 may have a configuration in which a plurality of users use a single user terminal. The augmented reality processing system 100 may include a plurality of servers.

Each of the server 10 and a plurality of the user terminals 20 is communicably connected to a communication network 30 such as the Internet. Connection between the communication network 30 and the server 10 and connection between the communication network 30 and the plurality of user terminals 20 may be wired connection or wireless connection. For example, the plurality of user terminals 20 may be connected to the communication network 30 by performing data communication with a base station managed by a communication service provider using a wireless communication line.

The augmented reality processing system 100, by including the server 10 and the user terminal 20, implements various functions for executing various processes in accordance with an operation of the user.

The server 10 includes a processor 101, a memory 102, and a storage device 103. For example, the processor 101 is a central processing device such as a central processing unit (CPU) that performs various calculations and controls. In addition, in a case where the server 10 includes a graphics processing unit (GPU), the GPU may perform a part of the various calculations and controls. The server 10 executes various information processes by the processor 101 using data read into the memory 102 and stores obtained process results in the storage device 103 as needed.

The storage device 103 has a function as a storage medium storing various information. A configuration of the storage device 103 is not particularly limited but is preferably a configuration capable of storing all of various information necessary for controls performed in the augmented reality processing system 100 from a viewpoint of reducing a process load exerted on the user terminal 20. Such examples include an HDD and an SSD. However, the storage device storing various information may have a storage region in an accessible state from the server 10 and, for example, may be configured to have a dedicated storage region outside the server 10. The server 10 is managed by a manager or the like of the augmented reality processing system 100 and has various functions for providing information related to various processes to the plurality of user terminals 20. The server 10 is configured with an information processing apparatus such as an AR server.

The user terminal 20 is configured with a communication terminal that can provide an information service accompanying display in AR to the user in a state where the user holds or wears the user terminal 20. Examples of the communication terminal include, for example, a mobile phone terminal 201 such as a smartphone and AR glasses 202 to 204. The communication terminal may be a stationary game apparatus, a portable game apparatus, a personal computer, or a so-called wearable device, or a combination of a plurality of the communication terminals. The configuration of the user terminal that may be included in the augmented reality processing system 100 is not limited thereto and may be a configuration in which the user may visually recognize the display in AR.

In the same manner as the server 10, the user terminal 20 includes a processor, a memory, and a storage device or the like. The user terminal 20 is connected to the communication network 30 and includes hardware and software for executing various processes by communicating with the server 10. Each of the plurality of user terminals 20 may be configured to be capable of directly communicating with each other without the server 10.

The user terminal 20 may incorporate a display device. In addition, the display device may be connected to the user terminal 20 in a wireless or wired manner. The display device displays images such as a still picture and a motion picture. The display device may display a game screen. In addition, the display device can perform display in augmented reality (AR) superimposed on a real space.

Examples of the display device include a hologram display device that can perform hologram display, and a projection device that projects images (including the game screen) to a screen or the like. In the example in FIG. 1, a touch panel screen included in the mobile phone terminal 201, AR displays included in the AR glasses 202, 203, and 204, and the like correspond to the display device.

The user terminal 20 may incorporate an input device. In addition, the input device may be connected to the user terminal 20 in a wireless or wired manner. The input device receives an operation input provided by the user. The processor included in the server 10 or the processor included in the user terminal 20 executes various control processes in accordance with the operation input provided by the user. Examples of the input device include the touch panel screen included in the mobile phone terminal 201, a controller CTR that is connected to the AR glasses 202 in a wireless or wired manner, and the like. In addition, a camera included in the user terminal 20 may correspond to the input device. The user provides the operation input (gesture input) by a gesture such as moving a hand in front of the camera. The user terminal is not limited thereto.

The user terminal 20 includes a tactile presentation device. Instead, the user terminal 20 may be connected to the tactile presentation device. The tactile presentation device is referred to as a haptic device. The tactile presentation device transmits tactile information to the user by exerting a force, a vibration, a motion, or the like on the user. Examples of the tactile presentation device include the controller CTR incorporating a vibration function, a clothing-type haptic device HPD in which vibrators are arranged in each location, and the like. The tactile presentation device is not limited thereto.

Figure 2:
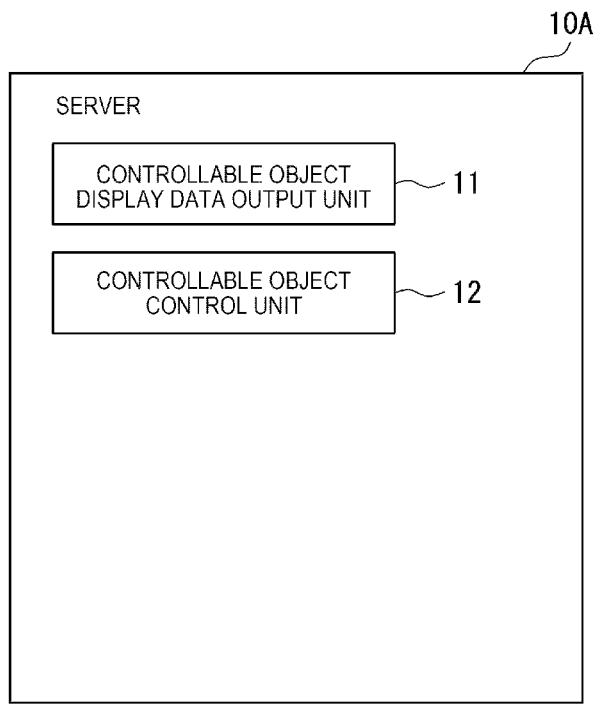
FIG. 2 is a block diagram illustrating a configuration of a server according to at least one embodiment of the present disclosure.

FIG. 2 is a block diagram illustrating a configuration of the server according to at least one embodiment of the present disclosure. A server 10A that is an example of the configuration of the server 10 includes at least a controllable object display data output unit 11 and a controllable object control unit 12. The processor included in the server 10A functionally implements the controllable object display data output unit 11 and the controllable object control unit 12 by referring to the augmented reality processing program held (installed) in the storage device and executing the program.

The controllable object display data output unit 11 has a function of outputting display data for displaying, in a superimposed manner on the real space, a controllable object that is a virtual object controllable by the user. The controllable object control unit 12 has a function of controlling at least one of an operation, movement, and a state change of the controllable object in accordance with the operation input provided by the user.

Figure 3:
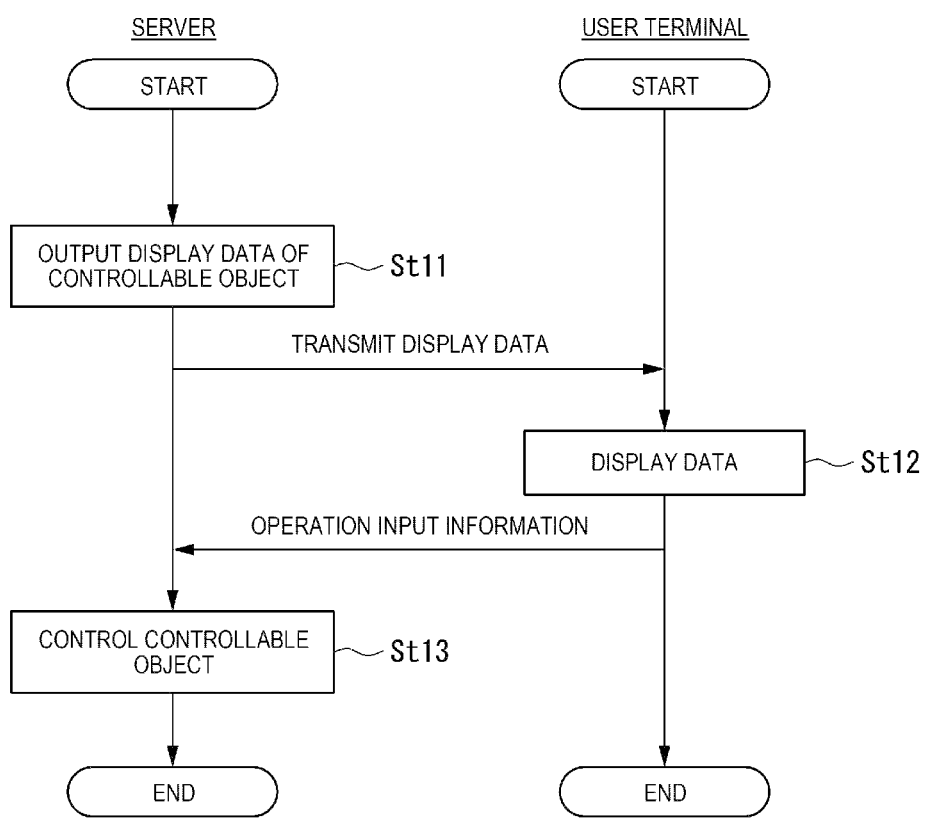
FIG. 3 is a sequence diagram illustrating an example of an augmented reality process according to at least one embodiment of the present disclosure.

Next, a program execution process in the first embodiment of the present disclosure will be described. FIG. 3 is a sequence diagram illustrating an example of an augmented reality process according to at least one embodiment of the present disclosure.

The controllable object display data output unit 11 outputs the display data for displaying, in a superimposed manner on the real space, the controllable object that is a virtual object controllable by the user (St11).

The server 10A transmits the display data to the user terminal 20, and the user terminal 20 displays the display data in AR on the display device (St12).

Operation input information is transmitted to the server 10A from the user terminal 20 through the input device (refer to FIG. 1) of the user terminal 20. The controllable object control unit 12 controls at least one of the operation, movement, and the state change of the controllable object in accordance with the operation input information (St13). The process may be repeated for the controllable object after the control is performed, by returning to step St11 again.

The controllable object means a virtual object controllable by the user. Examples of the controllable object include a vehicle that appears in a video game and is controllable by the user. Examples of the vehicle include an automobile, an electric train, a motorcycle, a ship, an airplane, a robot, and the like. Examples of the controllable object also include animate objects and the like such as a bird, a cat, a dog, a dinosaur, and a monster controllable by the user. A character controllable by the user is also an example of the controllable object. However, the controllable object is not limited to the above specific examples.

The display data is data for displaying the controllable object or the like on the display device. For example, data for displaying the controllable object or an augmented reality diorama, described later, on the display device (refer to FIG. 1) capable of performing the display in augmented reality (AR) corresponds to the display data.

Displaying in a superimposed manner on the real space means further displaying the controllable object, the augmented reality diorama, described later, or the like in an overlaid manner in a state where any element (in a case of an indoor space, a wall; in a case of an outdoor space, a built object or a road, the sky or the sea, or the like) in the real space is captured. Such a display aspect is referred to as the display in AR.

The operation of the controllable object means a motion of the controllable object. For example, in a case where the controllable object is an automobile, turning wheels right or left is an example of the operation. In a case where the controllable object is a robot or a character, bending a leg, swinging a sword held in hands down, or the like is an example of the operation. Movement of the controllable object means a change in position of the controllable object. The state change of the controllable object means a change in state of the controllable object. For example, light emission of headlights of the controllable object that is an electric train, or unfolding of the controllable object that is a robot is an example of the state change. In addition, an increase in movement speed of the controllable object that is a character, or setting a state where a special ability can be exhibited is also an example of the state change.

As one aspect of the first embodiment, the display device displays the output display data, and the user can control the controllable object. Thus, interest of the user can be improved.

Second Embodiment

A summary of a second embodiment of the present disclosure will be described. Hereinafter, an augmented reality processing program executed in a server will be illustratively described as the second embodiment. The server may be the server 10 included in the augmented reality processing system 100 illustrated in FIG. 1.

Figure 4:
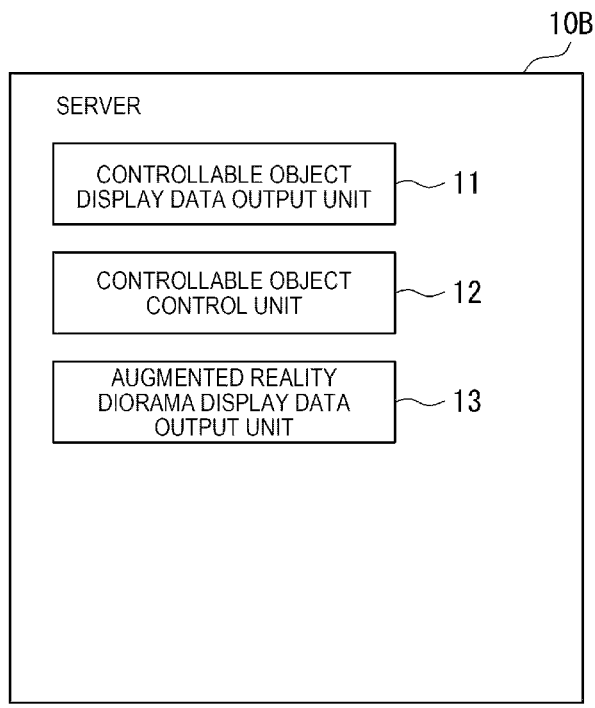
FIG. 4 is a block diagram illustrating a configuration of the server according to at least one embodiment of the present disclosure.

FIG. 4 is a block diagram illustrating a configuration of the server according to at least one embodiment of the present disclosure. A server 10B that is an example of the configuration of the server 10 includes at least the controllable object display data output unit 11, the controllable object control unit 12, and an augmented reality diorama display data output unit 13. The processor included in the server 10B functionally implements the controllable object display data output unit 11, the controllable object control unit 12, and the augmented reality diorama display data output unit 13 by referring to the augmented reality processing program held (installed) in the storage device and executing the program.

The controllable object display data output unit 11 has a function of outputting the display data for displaying, in a superimposed manner on the real space, the controllable object that is a virtual object controllable by the user. The controllable object control unit 12 has a function of controlling at least one of the operation, movement, and the state change of the controllable object in accordance with the operation input provided by the user. The augmented reality diorama display data output unit 13 has a function of outputting the display data for displaying the augmented reality diorama in a superimposed manner on the real space.

Figure 5:
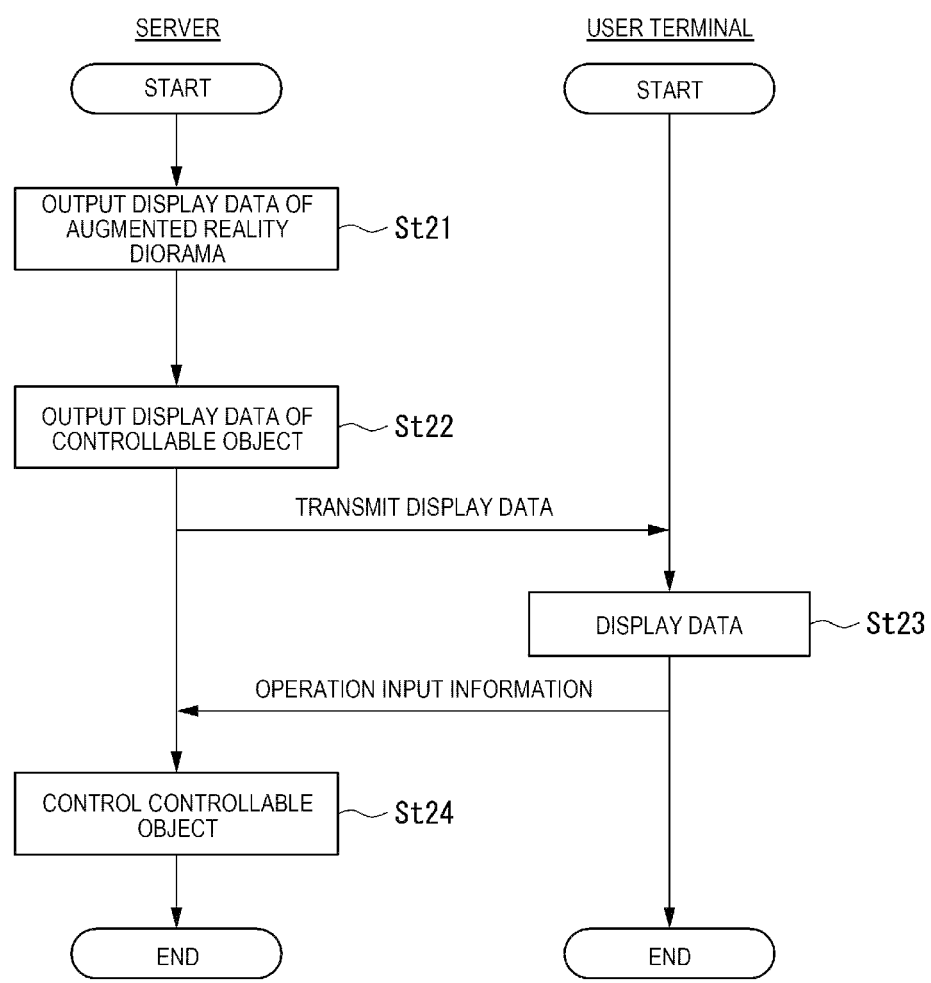
FIG. 5 is a sequence diagram illustrating an example of the augmented reality process according to at least one embodiment of the present disclosure.

Next, a program execution process in the second embodiment of the present disclosure will be described. FIG. 5 is a sequence diagram illustrating an example of the augmented reality process according to at least one embodiment of the present disclosure.

The augmented reality diorama display data output unit 13 outputs the display data for displaying the augmented reality diorama in a superimposed manner on the real space (St21).

The controllable object display data output unit 11 outputs the display data for displaying, in a superimposed manner on the real space, the controllable object that is a virtual object controllable by the user (St22).

The server 10B transmits the display data to the user terminal 20, and the user terminal 20 displays the display data in AR on the display device (St23).

The operation input information is transmitted to the server 10B from the user terminal 20 through the input device (refer to FIG. 1) of the user terminal 20. The controllable object control unit 12 controls at least one of the operation, movement, and the state change of the controllable object in accordance with the operation input information (St24). The process may be repeated for the controllable object after the control is performed, by returning to step St21 again.

The augmented reality diorama means a virtual diorama displayed in a superimposed manner on the real space. Examples of the augmented reality diorama include a street, a road, a railway, a built object, a group of built objects, a stadium of baseball, soccer, or the like, a shrine or a temple, a castle, a mountain, the sea, a river, a swamp, a grove, a forest, a field, a paddy field, an airport, an underground passage, a cave, and the like represented as 3D model data to be displayed in augmented reality (AR). The augmented reality diorama may not necessarily be based on a modern landscape that exists in the reality. Examples of the augmented reality diorama also include a medieval European streetscape or construction and a fictional streetscape or construction appearing in an animation, a comic book, or the like.

The controllable object means a virtual object controllable by the user. Examples of the controllable object include a vehicle that appears in a video game and is controllable by the user. Examples of the vehicle include an automobile, an electric train, a motorcycle, a ship, an airplane, a robot, and the like. Examples of the controllable object also include animate objects and the like such as a bird, a cat, a dog, a dinosaur, and a monster controllable by the user. A character controllable by the user is also an example of the controllable object. However, the controllable object is not limited to the above specific examples.

The display data is data for displaying the augmented reality diorama, the controllable object, or the like on the display device. For example, data for displaying the controllable object or the augmented reality diorama on the display device (refer to FIG. 1) capable of performing display in augmented reality (AR) corresponds to the display data.

Displaying in a superimposed manner on the real space means further displaying the controllable object, the augmented reality diorama, or the like in an overlaid manner in a state where any element (in a case of an indoor space, a wall; in a case of an outdoor space, a built object or a road, the sky or the sea, or the like) in the real space is captured. Such a display aspect is referred to as the display in AR.

The operation of the controllable object means a motion of the controllable object. For example, in a case where the controllable object is an automobile, turning wheels right or left is an example of the operation. In a case where the controllable object is a robot or a character, bending a leg, swinging a sword held in hands down, or the like is an example of the operation. Movement of the controllable object means a change in position of the controllable object. The state change of the controllable object means a change in state of the controllable object. For example, light emission of headlights of the controllable object that is an electric train, or unfolding of the controllable object that is a robot is an example of the state change. In addition, an increase in movement speed of the controllable object that is a character, or setting a state where a special ability can be exhibited is also an example of the state change.

As one aspect of the second embodiment, the display device displays the output display data, and the user can control the controllable object on the displayed augmented reality diorama. Thus, the interest of the user can be further improved.

Third Embodiment

A summary of a third embodiment of the present disclosure will be described. Hereinafter, an augmented reality processing program executed in a server will be illustratively described as the third embodiment. The server may be the server 10 included in the augmented reality processing system 100 illustrated in FIG. 1.

Figure 6:
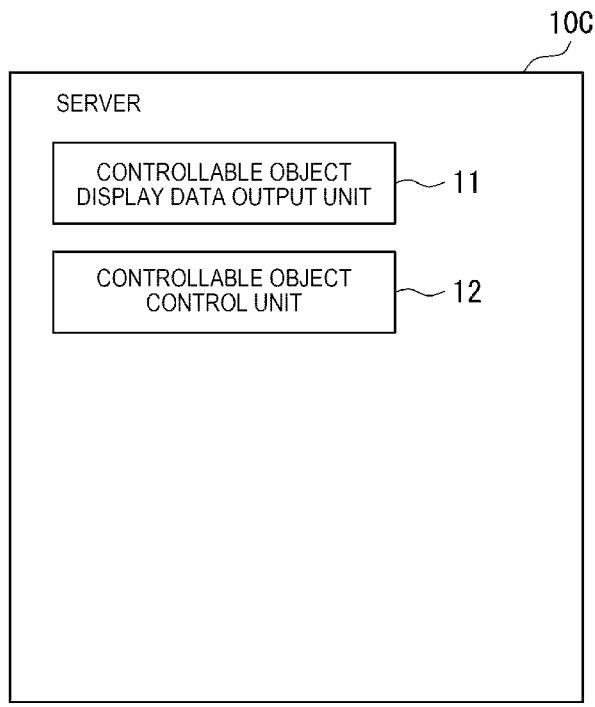
FIG. 6 is a block diagram illustrating a configuration of the server according to at least one embodiment of the present disclosure.

FIG. 6 is a block diagram illustrating a configuration of the server according to at least one embodiment of the present disclosure. A server 10C that is an example of the configuration of the server 10 includes at least the controllable object display data output unit 11 and the controllable object control unit 12. The processor included in the server 10C functionally implements the controllable object display data output unit 11 and the controllable object control unit 12 by referring to the augmented reality processing program held (installed) in the storage device and executing the program.

The controllable object display data output unit 11 has a function of outputting the display data for displaying, in an enlarged state in a superimposed manner on the real space, the controllable object that is a virtual object controllable by the user. The controllable object control unit 12 has a function of controlling at least one of the operation, movement, and the state change of the controllable object in accordance with the operation input provided by the user.

Figure 7:
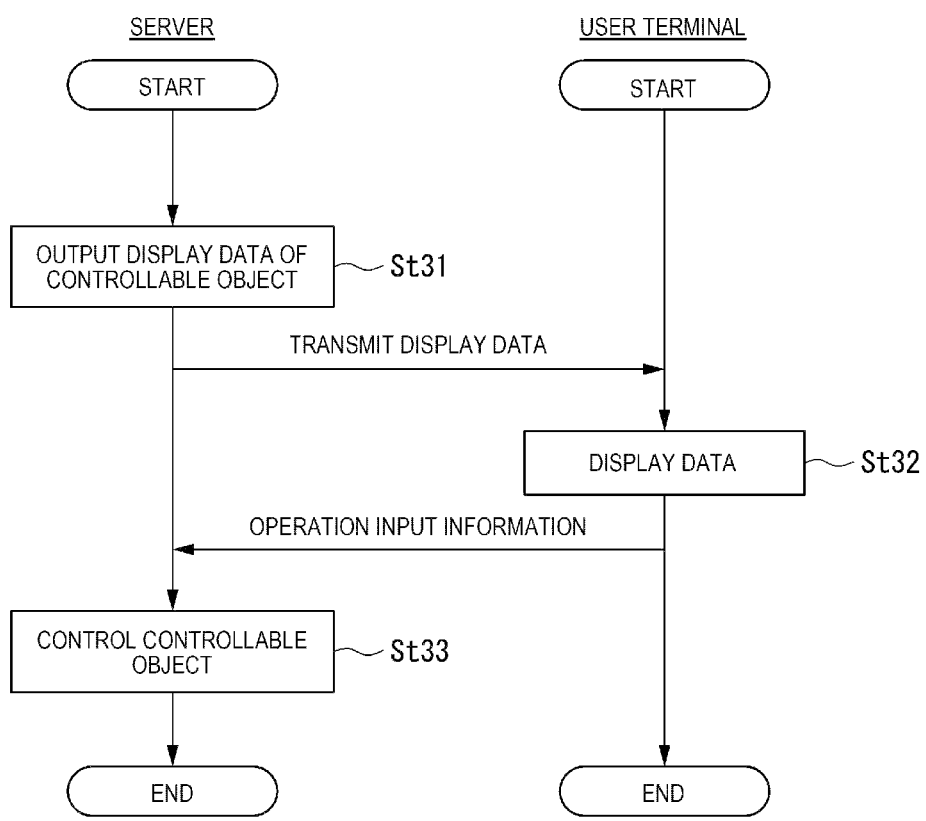
FIG. 7 is a sequence diagram illustrating an example of the augmented reality process according to at least one embodiment of the present disclosure.

Next, a program execution process in the third embodiment of the present disclosure will be described. FIG. 7 is a sequence diagram illustrating an example of the augmented reality process according to at least one embodiment of the present disclosure.

The controllable object display data output unit 11 outputs the display data for displaying, in an enlarged state in a superimposed manner on the real space, the controllable object that is a virtual object controllable by the user (St31).

The server 100 transmits the display data to the user terminal 20, and the user terminal 20 displays the display data in AR on the display device (St32).

The operation input information is transmitted to the server 10C from the user terminal 20 through the input device (refer to FIG. 1) of the user terminal 20. The controllable object control unit 12 controls at least one of the operation, movement, and the state change of the controllable object in accordance with the operation input information (St33). The process may be repeated for the controllable object after the control is performed, by returning to step St31 again.

The controllable object means a virtual object controllable by the user. Examples of the controllable object include a vehicle that appears in a video game and is controllable by the user. Examples of the vehicle include an automobile, an electric train, a motorcycle, a ship, an airplane, a robot, and the like. Examples of the controllable object also include animate objects and the like such as a bird, a cat, a dog, a dinosaur, and a monster controllable by the user. A character controllable by the user is also an example of the controllable object. However, the controllable object is not limited to the above specific examples.

The display data is data for displaying the controllable object or the like on the display device. For example, data for displaying the controllable object or the augmented reality diorama on the display device (refer to FIG. 1) capable of performing the display in augmented reality (AR) corresponds to the display data.

Displaying in a superimposed manner on the real space means further displaying the controllable object, the augmented reality diorama, or the like in an overlaid manner in a state where any element (in a case of an indoor space, a wall; in a case of an outdoor space, a built object or a road, the sky or the sea, or the like) in the real space is captured. Such a display aspect is referred to as the display in AR.

The operation of the controllable object means a motion of the controllable object. For example, in a case where the controllable object is an automobile, turning wheels right or left is an example of the operation. In a case where the controllable object is a robot or a character, bending a leg, swinging a sword held in hands down, or the like is an example of the operation. Movement of the controllable object means a change in position of the controllable object. The state change of the controllable object means a change in state of the controllable object. For example, light emission of headlights of the controllable object that is an electric train, or unfolding of the controllable object that is a robot is an example of the state change. In addition, an increase in movement speed of the controllable object that is a character, or setting a state where a special ability can be exhibited is also an example of the state change.

As one aspect of the third embodiment, the display device displays the output display data, and the user can control the enlarged controllable object. Thus, the user can have an experience that feels like controlling the controllable object by actually boarding the controllable object, and the interest of the user can be further improved.

Fourth Embodiment

A summary of a fourth embodiment of the present disclosure will be described. Hereinafter, an augmented reality processing system will be illustratively described as the fourth embodiment.

Figure 8:
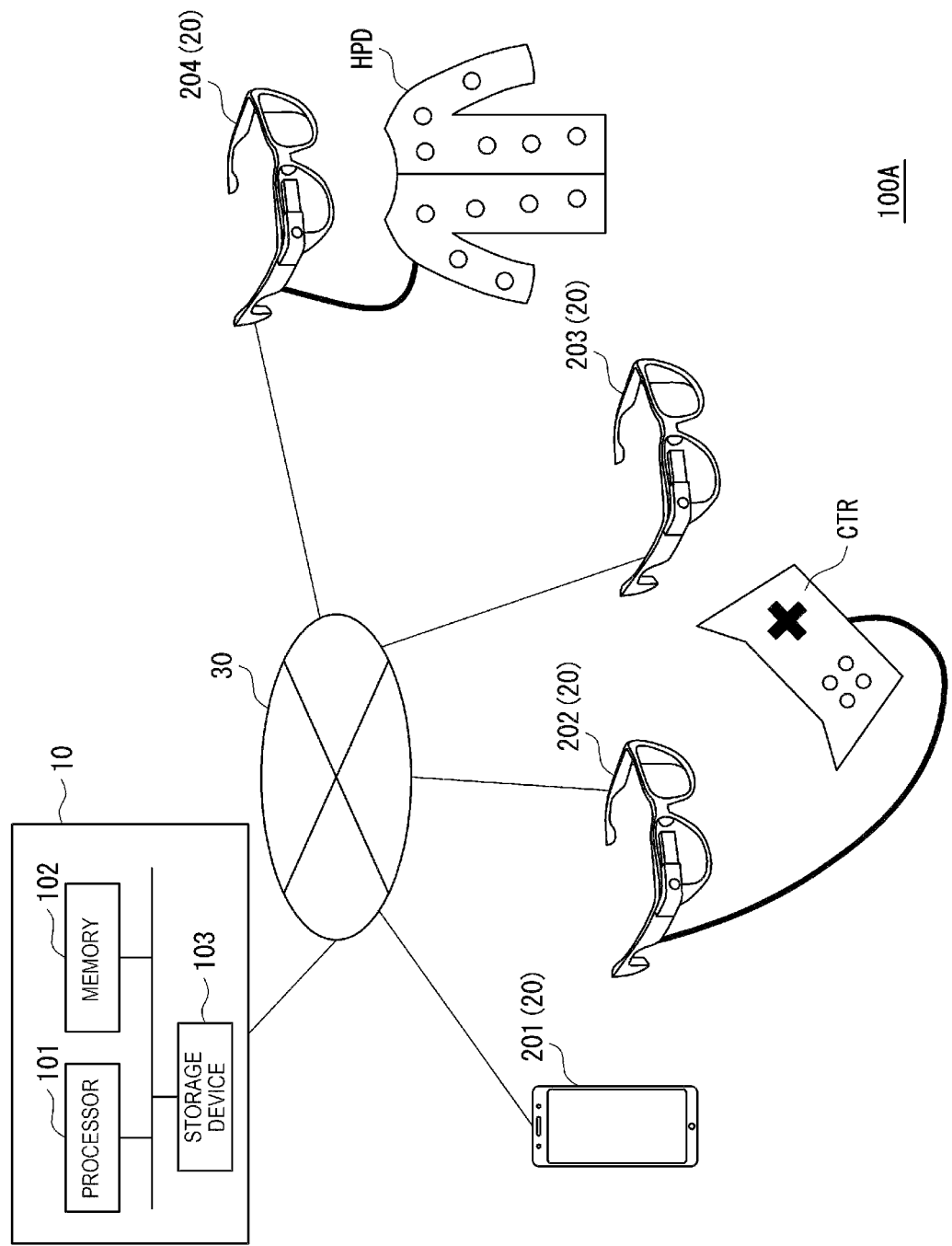
FIG. 8 is a diagram illustrating an example of the configuration of the augmented reality processing system according to at least one embodiment of the present disclosure.

FIG. 8 is a diagram illustrating an example of a configuration of the augmented reality processing system according to at least one embodiment of the present disclosure. An augmented reality processing system 100A includes the augmented reality processing server 10 (server 10) and the user terminal 20 used by a user of the augmented reality processing system 100A. Each of the user terminals 201, 202, 203, and 204 is an example of the user terminal 20. The configuration of the augmented reality processing system 100A is not limited thereto. For example, the augmented reality processing system 100A may have a configuration in which a plurality of users use a single user terminal. The augmented reality processing system 100A may include a plurality of servers.

Each of the server 10 and the plurality of user terminals 20 is communicably connected to the communication network 30 such as the Internet. Connection between the communication network 30 and the server 10 and connection between the communication network 30 and the plurality of user terminals 20 may be wired connection or wireless connection. For example, the plurality of user terminals 20 may be connected to the communication network 30 by performing data communication with a base station managed by a communication service provider using a wireless communication line.

The augmented reality processing system 100A, by including the server 10 and the user terminal 20, implements various functions for executing various processes in accordance with the operation of the user.

The server 10 includes the processor 101, the memory 102, and the storage device 103. For example, the processor 101 is a central processing device such as a central processing unit (CPU) that performs various calculations and controls. In addition, in a case where the server 10 includes a graphics processing unit (GPU), the GPU may perform a part of the various calculations and controls. The server 10 executes various information processes by the processor 101 using data read into the memory 102 and stores obtained process results in the storage device 103 as needed.

The storage device 103 has a function as a storage medium storing various information. A configuration of the storage device 103 is not particularly limited but is preferably a configuration capable of storing all of various information necessary for controls performed in the augmented reality processing system 100A from the viewpoint of reducing the process load exerted on the user terminal 20. Such examples include an HDD and an SSD. However, the storage device storing various information may have a storage region in an accessible state from the server 10 and, for example, may be configured to have a dedicated storage region outside the server 10. The server 10 is managed by a manager or the like of the augmented reality processing system 100A and has various functions for providing information related to various processes to the plurality of user terminals 20. The server 10 is configured with an information processing apparatus such as an AR server.

The user terminal 20 is configured with a communication terminal that can provide an information service accompanying display in AR to the user in a state where the user holds or wears the user terminal 20. Examples of the communication terminal include, for example, the mobile phone terminal 201 such as a smartphone and the AR glasses 202 to 204. The communication terminal may be a stationary game apparatus, a portable game apparatus, a personal computer, or a so-called wearable device, or a combination of a plurality of the communication terminals. The configuration of the user terminal that may be included in the augmented reality processing system 100A is not limited thereto and may be a configuration in which the user may visually recognize the display in AR.

In the same manner as the server 10, the user terminal 20 includes a processor, a memory, and a storage device or the like. The user terminal 20 is connected to the communication network 30 and includes hardware and software for executing various processes by communicating with the server 10. Each of the plurality of user terminals 20 may be configured to be capable of directly communicating with each other without the server 10.

The user terminal 20 may incorporate a display device. In addition, the display device may be connected to the user terminal 20 in a wireless or wired manner. The display device displays images such as a still picture and a motion picture. The display device may display a game screen. In addition, the display device can perform the display in augmented reality (AR) superimposed on the real space. Examples of the display device include a hologram display device that can perform hologram display, and a projection device that projects images (including the game screen) to a screen or the like. In the example in FIG. 8, the touch panel screen included in the mobile phone terminal 201, the AR displays included in the AR glasses 202, 203, and 204, and the like correspond to the display device.

The user terminal 20 may incorporate an input device. In addition, the input device may be connected to the user terminal 20 in a wireless or wired manner. The input device receives an operation input provided by the user. The processor included in the server 10 or the processor included in the user terminal 20 executes various control processes in accordance with the operation input provided by the user. Examples of the input device include the touch panel screen included in the mobile phone terminal 201, the controller CTR that is connected to the AR glasses 202 in a wireless or wired manner, and the like. In addition, a camera included in the user terminal 20 may correspond to the input device. The user provides the operation input (gesture input) by a gesture such as moving a hand in front of the camera. The user terminal is not limited thereto.

The user terminal 20 includes a tactile presentation device. Instead, the user terminal 20 may be connected to the tactile presentation device. The tactile presentation device is referred to as a haptic device. The tactile presentation device transmits tactile information to the user by exerting a force, a vibration, a motion, or the like on the user. Examples of the tactile presentation device include the controller CTR incorporating a vibration function, the clothing-type haptic device HPD in which vibrators are arranged in each location, and the like. The tactile presentation device is not limited thereto.

Figure 9:
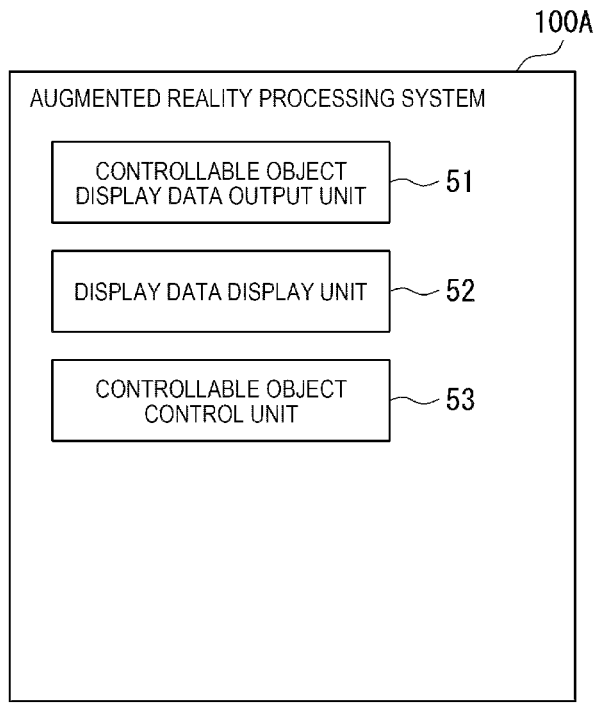
FIG. 9 is a block diagram illustrating a configuration of the augmented reality processing system according to at least one embodiment of the present disclosure.

FIG. 9 is a block diagram illustrating the configuration of the augmented reality processing system according to at least one embodiment of the present disclosure. The augmented reality processing system 100A includes at least a controllable object display data output unit 51, a display data display unit 52, and a controllable object control unit 53. One or more processors included in the augmented reality processing system 100A functionally implement the controllable object display data output unit 51, the display data display unit 52, and the controllable object control unit 53 by referring to the augmented reality processing program held (installed) in one or more storage devices included in the augmented reality processing system 100A and executing the program.

The controllable object display data output unit 51 has a function of outputting the display data for displaying, in a superimposed manner on the real space, the controllable object that is a virtual object controllable by the user. The display data display unit 52 has a function of displaying the display data on the display device. The controllable object control unit 53 has a function of controlling at least one of the operation, movement, and the state change of the controllable object in accordance with the operation input provided by the user.

Figure 10:
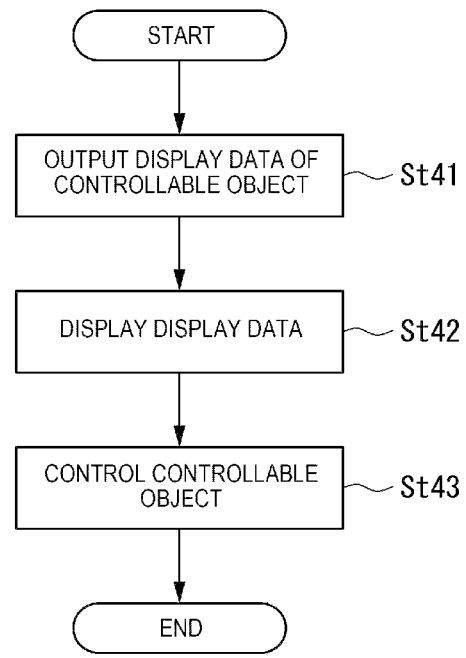
FIG. 10 is a flowchart illustrating an example of the augmented reality process according to at least one embodiment of the present disclosure.

Next, a program execution process in the fourth embodiment of the present disclosure will be described. FIG. 10 is a flowchart illustrating an example of the augmented reality process according to at least one embodiment of the present disclosure.

The controllable object display data output unit 51 outputs the display data for displaying, in a superimposed manner on the real space, the controllable object that is a virtual object controllable by the user (St41).

The display data display unit 52 displays the display data in AR on the display device (St42).

The controllable object control unit 53 controls at least one of the operation, movement, and the state change of the controllable object in accordance with the operation input provided by the user (St43). The process may be repeated for the controllable object after the control is performed, by returning to step St41 again.

A process entity of step St41 may be the server 10 or the user terminal 20. In addition, the server 10 and the user terminal 20 may perform the process in step St41 in cooperation.

A process entity of step St42 may be the server 10 or the user terminal 20. For example, a display device shared by a plurality of users may be connected to the communication network 30, and the server 10 or the user terminal 20 may display the display data on the display device.

A process entity of step St43 may be the server 10 or the user terminal 20. In addition, the server 10 and the user terminal 20 may perform the process in step St43 in cooperation.

The controllable object means a virtual object controllable by the user. Examples of the controllable object include a vehicle that appears in a video game and is controllable by the user. Examples of the vehicle include an automobile, an electric train, a motorcycle, a ship, an airplane, a robot, and the like. Examples of the controllable object also include animate objects and the like such as a bird, a cat, a dog, a dinosaur, and a monster controllable by the user. A character controllable by the user is also an example of the controllable object. However, the controllable object is not limited to the above specific examples.

The display data is data for displaying the controllable object or the like on the display device. For example, data for displaying the controllable object or the augmented reality diorama on the display device (refer to FIG. 8) capable of performing the display in augmented reality (AR) corresponds to the display data.

Displaying in a superimposed manner on the real space means further displaying the controllable object, the augmented reality diorama, or the like in an overlaid manner in a state where any element (in a case of an indoor space, a wall; in a case of an outdoor space, a built object or a road, the sky or the sea, or the like) in the real space is captured. Such a display aspect is referred to as the display in AR.

The operation of the controllable object means a motion of the controllable object. For example, in a case where the controllable object is an automobile, turning wheels right or left is an example of the operation. In a case where the controllable object is a robot or a character, bending a leg, swinging a sword held in hands down, or the like is an example of the operation. Movement of the controllable object means a change in position of the controllable object. The state change of the controllable object means a change in state of the controllable object. For example, light emission of headlights of the controllable object that is an electric train, or unfolding of the controllable object that is a robot is an example of the state change. In addition, an increase in movement speed of the controllable object that is a character, or setting a state where a special ability can be exhibited is also an example of the state change.

As one aspect of the fourth embodiment, the display device displays the output display data, and the user can control the controllable object. Thus, the interest of the user can be improved.

Fifth Embodiment

A summary of a fifth embodiment of the present disclosure will be described. Hereinafter, an augmented reality processing program executed in a user terminal will be illustratively described as the fifth embodiment. A user terminal 20A may be any of the plurality of user terminals 20 and 201 to 204 illustrated in FIG. 1 or FIG. 8.

Figure 11:
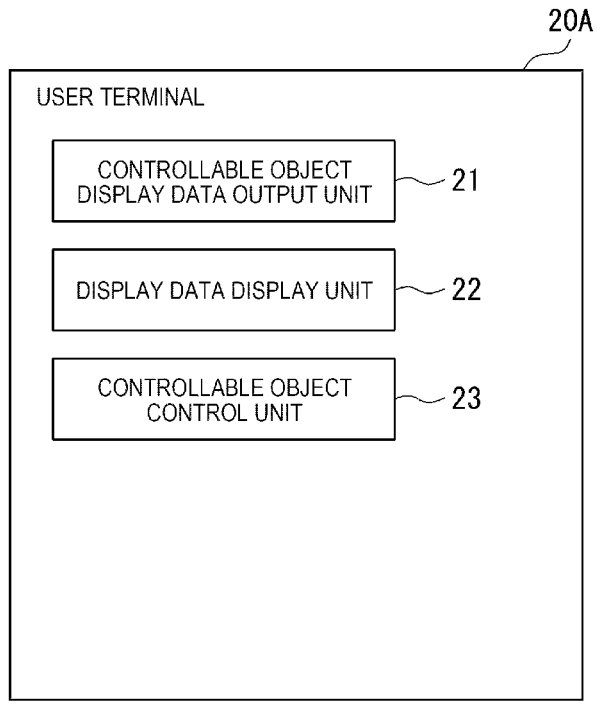
FIG. 11 is a block diagram illustrating a configuration of a user terminal according to at least one embodiment of the present disclosure.

FIG. 11 is a block diagram illustrating a configuration of the user terminal according to at least one embodiment of the present disclosure. The user terminal 20A that is an example of the configuration of the user terminal 20 includes at least a controllable object display data output unit 21, a display data display unit 22, and a controllable object control unit 23. The processor included in the user terminal 20A functionally implements the controllable object display data output unit 21, the display data display unit 22, and the controllable object control unit 23 by referring to the augmented reality processing program held (installed) in the storage device included in the user terminal 20A and executing the program.

The controllable object display data output unit 21 has a function of outputting the display data for displaying, in a superimposed manner on the real space, the controllable object that is a virtual object controllable by the user. The display data display unit 22 has a function of displaying the display data on the display device. The controllable object control unit 23 has a function of controlling at least one of the operation, movement, and the state change of the controllable object in accordance with the operation input provided by the user.

Figure 12:
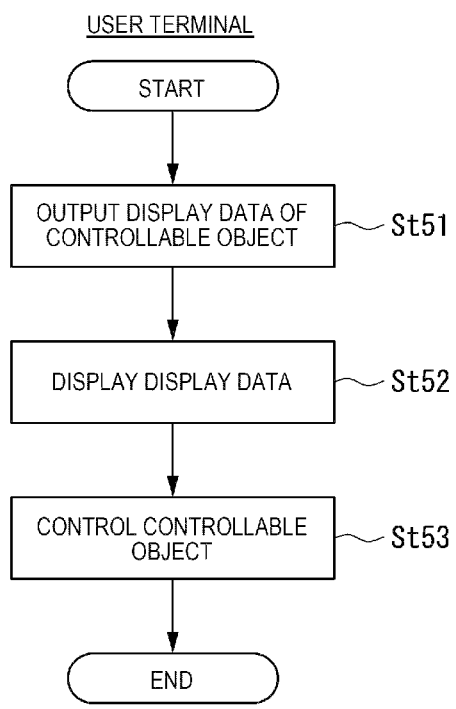
FIG. 12 is a flowchart illustrating an example of the augmented reality process according to at least one embodiment of the present disclosure.

Next, a program execution process in the fifth embodiment of the present disclosure will be described. FIG. 12 is a flowchart illustrating an example of the augmented reality process according to at least one embodiment of the present disclosure.

The controllable object display data output unit 21 outputs the display data for displaying, in a superimposed manner on the real space, the controllable object that is a virtual object controllable by the user (St51).

The display data display unit 22 displays the display data in AR on the display device (St52).

The controllable object control unit 23 controls at least one of the operation, movement, and the state change of the controllable object in accordance with the operation input provided by the user (St53). The process may be repeated for the controllable object after the control is performed, by returning to step St51 again.

The controllable object means a virtual object controllable by the user. Examples of the controllable object include a vehicle that appears in a video game and is controllable by the user. Examples of the vehicle include an automobile, an electric train, a motorcycle, a ship, an airplane, a robot, and the like. Examples of the controllable object also include animate objects and the like such as a bird, a cat, a dog, a dinosaur, and a monster controllable by the user. A character controllable by the user is also an example of the controllable object. However, the controllable object is not limited to the above specific examples.

The display data is data for displaying the controllable object or the like on the display device. For example, data for displaying the controllable object or the augmented reality diorama on the display device (refer to FIG. 1 or FIG. 8) capable of performing the display in augmented reality (AR) corresponds to the display data.

Displaying in a superimposed manner on the real space means further displaying the controllable object, the augmented reality diorama, or the like in an overlaid manner in a state where any element (in a case of an indoor space, a wall; in a case of an outdoor space, a built object or a road, the sky or the sea, or the like) in the real space is captured. Such a display aspect is referred to as the display in AR.

The operation of the controllable object means a motion of the controllable object. For example, in a case where the controllable object is an automobile, turning wheels right or left is an example of the operation. In a case where the controllable object is a robot or a character, bending a leg, swinging a sword held in hands down, or the like is an example of the operation. Movement of the controllable object means a change in position of the controllable object. The state change of the controllable object means a change in state of the controllable object. For example, light emission of headlights of the controllable object that is an electric train, or unfolding of the controllable object that is a robot is an example of the state change. In addition, an increase in movement speed of the controllable object that is a character, or setting a state where a special ability can be exhibited is also an example of the state change.

As one aspect of the fifth embodiment, the display device displays the output display data, and the user can control the controllable object. Thus, the interest of the user can be improved.

Sixth Embodiment

A summary of a sixth embodiment of the present disclosure will be described. Hereinafter, an augmented reality processing program executed in a server will be illustratively described as the sixth embodiment.

Figure 13:
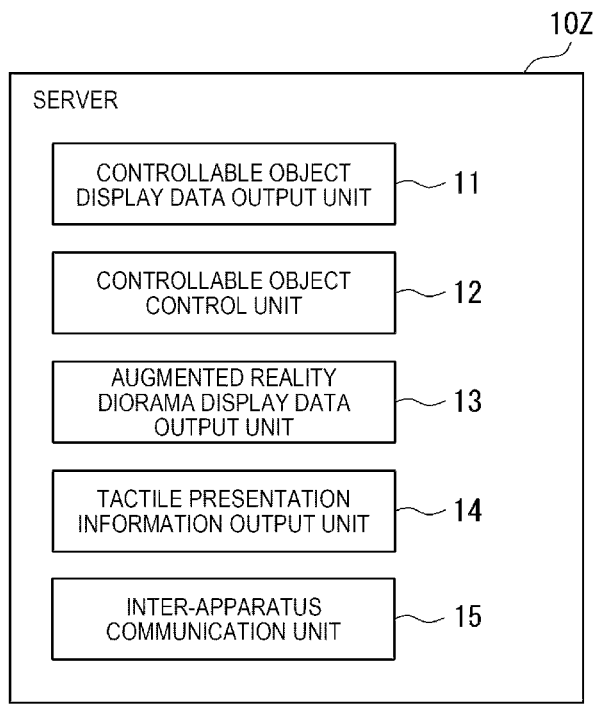
FIG. 13 is a block diagram illustrating a configuration of the server according to at least one embodiment of the present disclosure.

FIG. 13 is a block diagram illustrating a configuration of the server according to at least one embodiment of the present disclosure. A server 10Z that is an example of the configuration of the server 10 includes the controllable object display data output unit 11, the controllable object control unit 12, the augmented reality diorama display data output unit 13, a tactile presentation information output unit 14, and an inter-apparatus communication unit 15. The processor included in the server 10Z functionally implements the controllable object display data output unit 11, the controllable object control unit 12, the augmented reality diorama display data output unit 13, the tactile presentation information output unit 14, and the inter-apparatus communication unit 15 by referring to the augmented reality processing program held (installed) in the storage device and executing the program.

The controllable object display data output unit 11 has a function of outputting the display data for displaying, in a superimposed manner on the real space, the controllable object that is a virtual object controllable by the user. The controllable object control unit 12 has a function of controlling at least one of the operation, movement, and the state change of the controllable object in accordance with the operation input provided by the user. The augmented reality diorama display data output unit 13 has a function of outputting the display data for displaying the augmented reality diorama in a superimposed manner on the real space. The tactile presentation information output unit 14 has a function of outputting tactile presentation information for driving the tactile presentation device based on at least one of the operation, movement, and the state change of the controllable object corresponding to the operation input provided by the user. The inter-apparatus communication unit 15 has a function of causing a plurality of apparatuses to perform communication.

Figure 14:
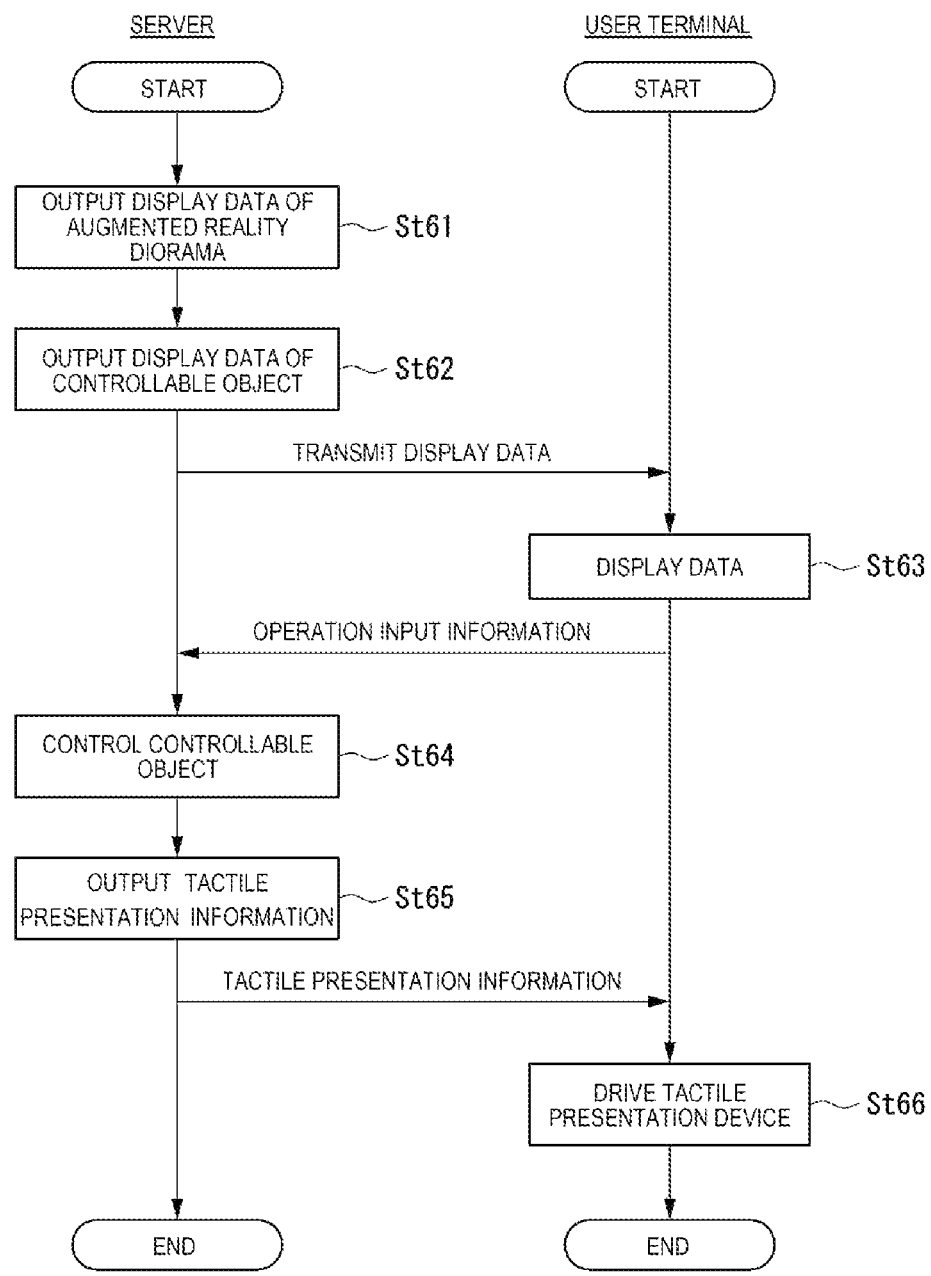
FIG. 14 is a sequence diagram illustrating an example of the augmented reality process according to at least one embodiment of the present disclosure.

Next, a program execution process in the sixth embodiment of the present disclosure will be described. FIG. 14 is a sequence diagram illustrating an example of the augmented reality process according to at least one embodiment of the present disclosure.

The augmented reality diorama display data output unit 13 outputs the display data for displaying the augmented reality diorama in a superimposed manner on the real space (St61).

The controllable object display data output unit 11 outputs the display data for displaying, in a superimposed manner on the real space, the controllable object that is a virtual object controllable by the user (St62).

The server 10Z transmits the display data to the user terminal 20, and the user terminal 20 displays the display data in AR on the display device (St63).

The operation input information is transmitted to the server 10Z from the user terminal 20 through the input device (refer to FIG. 1 or FIG. 8) of the user terminal 20. The controllable object control unit 12 controls at least one of the operation, movement, and the state change of the controllable object in accordance with the operation input information (St64).

The tactile presentation information output unit 14 outputs the tactile presentation information for driving the tactile presentation device based on at least one of the operation, movement, and the state change of the controllable object corresponding to the operation input provided by the user (St65).

The server 10Z transmits the tactile presentation information to the user terminal 20, and the user terminal 20 drives the tactile presentation device based on the received tactile presentation information (St66).

The process may be repeated for the controllable object after the control in step St64 is performed, by returning to step St61 again.

The augmented reality diorama means a virtual diorama displayed in a superimposed manner on the real space. Examples of the augmented reality diorama include a street, a road, a railway, a built object, a group of built objects, a stadium of baseball, soccer, or the like, a shrine or a temple, a castle, a mountain, the sea, a river, a swamp, a grove, a forest, a field, a paddy field, an airport, an underground passage, a cave, and the like represented as 3D model data to be displayed in augmented reality (AR). The augmented reality diorama may not necessarily be based on a modern landscape that exists in the reality. Examples of the augmented reality diorama also include a medieval European streetscape or construction and a fictional streetscape or construction appearing in an animation, a comic book, or the like.

The controllable object means a virtual object controllable by the user. Examples of the controllable object include a vehicle that appears in a video game and is controllable by the user. Examples of the vehicle include an automobile, an electric train, a motorcycle, a ship, an airplane, a robot, and the like. Examples of the controllable object also include animate objects and the like such as a bird, a cat, a dog, a dinosaur, and a monster controllable by the user. A character controllable by the user is also an example of the controllable object. However, the controllable object is not limited to the above specific examples. An actual object corresponding to the controllable object may be in a state of being not present in the real space. The user controls the virtual controllable object displayed in augmented reality (AR) instead of the actual object. In a case of controlling the virtual controllable object instead of the actual object, the user can freely control the controllable object without being affected by a built object, a wall, furniture, an obstacle, or the like present in the real space. The virtual controllable object may be controlled to be affected (for example, hit) by a built object, a wall, furniture, or the like present in the real space.

The display data is data for displaying the controllable object or the like on the display device. For example, data for displaying the controllable object or the augmented reality diorama on the display device (refer to FIG. 1 or FIG. 8) capable of performing the display in augmented reality (AR) corresponds to the display data.

Displaying in a superimposed manner on the real space means further displaying the controllable object, the augmented reality diorama, or the like in an overlaid manner in a state where any element (in a case of an indoor space, a wall; in a case of an outdoor space, a built object or a road, the sky or the sea, or the like) in the real space is captured. Such a display aspect is referred to as the display in AR.

The operation of the controllable object means a motion of the controllable object. For example, in a case where the controllable object is an automobile, turning wheels right or left is an example of the operation. In a case where the controllable object is a robot or a character, bending a leg, swinging a sword held in hands down, or the like is an example of the operation. Movement of the controllable object means a change in position of the controllable object. The state change of the controllable object means a change in state of the controllable object. For example, light emission of headlights of the controllable object that is an electric train, or unfolding of the controllable object that is a robot is an example of the state change. In addition, an increase in movement speed of the controllable object that is a character, or setting a state where a special ability can be exhibited is also an example of the state change.

The tactile presentation information means information for driving the tactile presentation device based on a desired driving condition. For example, command information indicating when, how strong, and how long to vibrate the controller CTR that is illustrated in FIG. 1 or FIG. 8 and incorporates a vibration function corresponds to the tactile presentation information. In addition, command information indicating when, how strong, and how long to vibrate which vibrator arranged in the clothing-type haptic device HPD illustrated in FIG. 1 or FIG. 8 corresponds to the tactile presentation information. The tactile presentation information is not limited to the command information illustrated here and may be information, for example, strength or a time period of wind to blow toward the user, for controlling means for transmitting tactile information to the user.

Figure 15:
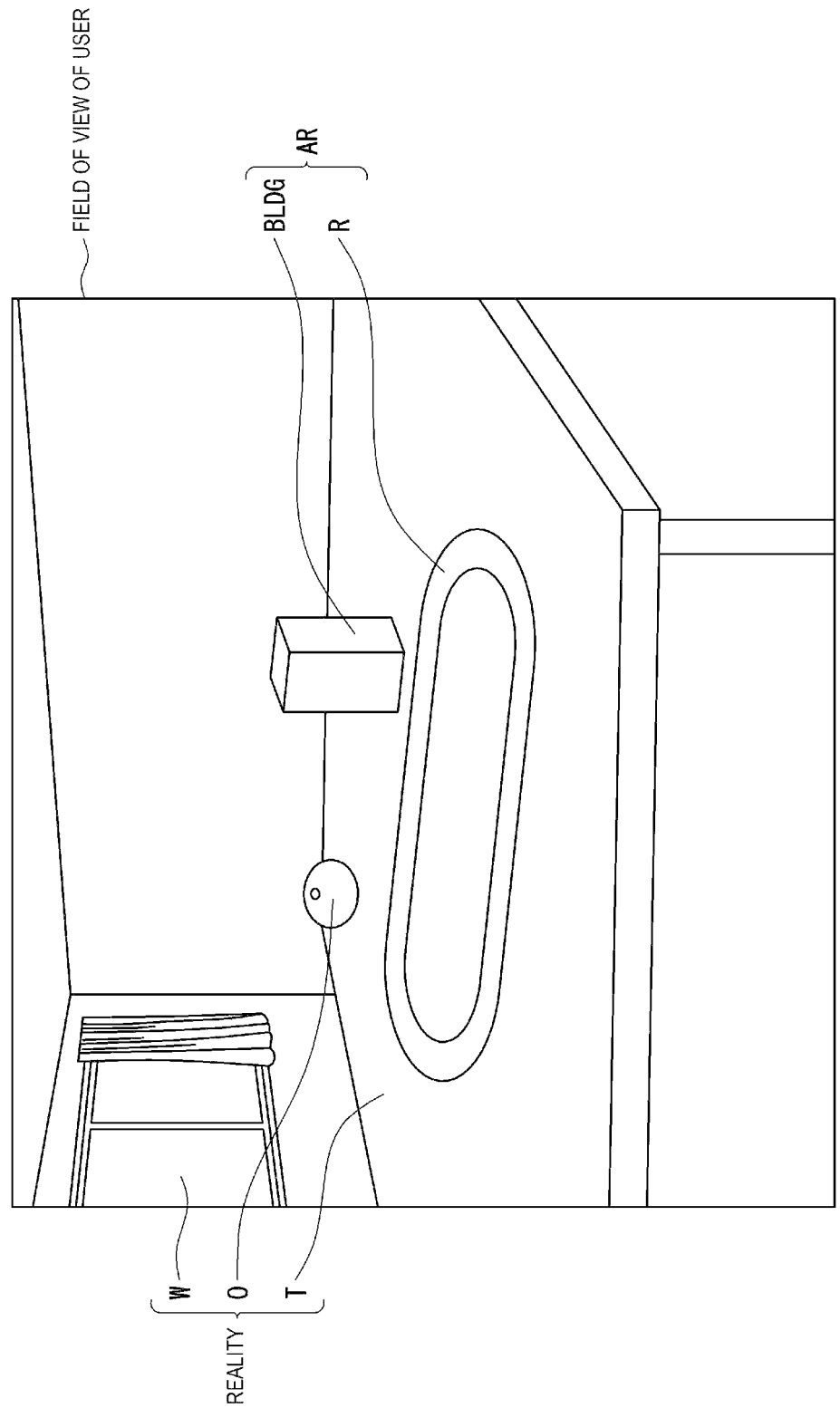
FIG. 15 is a diagram illustrating a display example by a display device according to at least one embodiment of the present disclosure.

FIG. 15 is a diagram illustrating a display example by the display device according to at least one embodiment of the present disclosure. A large rectangular frame in FIG. 15 illustrates a field of view of the user. While a field of view of a person does not have a rectangular shape in a strict sense, the field of view is divided by the rectangular frame for convenience of description accompanying illustration. For example, in a case of using the AR glasses, the field of view of the user is wider than the illustrated rectangular frame. For example, in a case of using the mobile phone terminal 201 such as a smartphone, the illustrated rectangular frame corresponds to a display screen of the mobile phone terminal 201. In this case, the display screen of the mobile phone terminal 201, a main body (part around the display screen) of the mobile phone terminal 201, and the real space outside the main body of the mobile phone terminal 201 enter the field of view of the user.

A window W, a table T, and an orange O placed on the table T enter the field of view of the user. The window W, the orange O, and the table T are actual objects present in the real space.

A building BLDG and a railway R enter the field of view of the user. The building BLDG and the railway R are displayed in AR as the augmented reality diorama. That is, the building BLDG and the railway R are displayed in a superimposed manner on the real space. The augmented reality diorama display data output unit 13 outputs display data for displaying the building BLDG and the railway R in a superimposed manner on the real space.

FIG. 16 is a diagram illustrating a display example by the display device according to at least one embodiment of the present disclosure. A large rectangular frame in FIG. 16 is the same as in FIG. 15 and thus, will not be described.

The window W, the table T, and the orange O placed on the table T enter the field of view of the user. The window W, the orange O, and the table T are actual objects present in the real space.

The building BLDG and the railway R enter the field of view of the user. The building BLDG and the railway R are displayed in AR as the augmented reality diorama. That is, the building BLDG and the railway R are displayed in a superimposed manner on the real space.

An electric train OBJ enters the field of view of the user. The electric train OBJ is displayed in AR as the controllable object. That is, the electric train OBJ is displayed in a superimposed manner on the real space. The controllable object display data output unit 11 outputs display data for displaying, in a superimposed manner on the real space, the electric train OBJ that is a controllable object.

FIG. 17 is a diagram illustrating a display example by the display device according to at least one embodiment of the present disclosure. A large rectangular frame in FIG. 17 is the same as in FIG. 15 and FIG. 16 and thus, will not be described.

The window W, the table T, and the orange O placed on the table T enter the field of view of the user. The window W, the orange O, and the table T are actual objects present in the real space.

The building BLDG and the railway R enter the field of view of the user. The building BLDG and the railway R are displayed in AR as the augmented reality diorama. That is, the building BLDG and the railway R are displayed in a superimposed manner on the real space.

The electric train OBJ enters the field of view of the user. The electric train OBJ is displayed in AR as the controllable object. That is, the electric train OBJ is displayed in a superimposed manner on the real space.

Furthermore, in FIG. 17, a control interface CI for controlling the electric train OBJ that is a controllable object enters the field of view of the user. The control interface CI may have a shape of a controller of a video game as illustrated. The control interface CI may have a shape of a general input interface such as a button, a switch, a lever, or a direction key. In addition, in a case where the controllable object is a vehicle such as an automobile or an electric train, the control interface CI may have the same shape as or a similar shape to a control apparatus, such as a steering wheel of the car or a master controller of the electric train, included in the vehicle that is an actual object present in the real space. The controllable object display data output unit 11 may output display data for displaying, for example, the control interface CI together with the electric train OBJ that is a controllable object.

The control interface CI may be displayed in AR on the display device included in the AR glasses or the like or may be normally displayed (not displayed in AR) on the display screen included in the mobile phone terminal 201 such as a smartphone. In a case of using an input device that is an actual object present in the real space like the controller CTR illustrated in FIG. 1 or FIG. 8, the control interface CI may not be displayed on the display device. In addition, even in a case of providing the operation input using a method such as providing a gesture input of performing an operation by a motion or the like of a hand of the user captured by the camera included in the AR glasses, the mobile phone terminal 201, or the like, or shaking or inclining the mobile phone terminal 201 left and right, the control interface CI may not be displayed on the display device.

The user provides the operation input by performing an operation such as tapping the displayed control interface CI (in a case of a user terminal including a touch panel), performing a gesture of touching the control interface CI (in a case of AR glasses), shaking or inclining the mobile phone terminal 201, or operating the controller CTR held in hands. As described above based on FIG. 14, the operation input information indicating the operation input is transmitted to the server 10Z from the user terminal 20. The controllable object control unit 12 controls at least one of the operation, movement, and the state change of the controllable object in accordance with the operation input information. As described above based on FIG. 14, the process may be repeated for the controllable object after the control in step St64 is performed. That is, after the controllable object control unit 12 performs the control, the controllable object display data output unit 11 may again output the display data of the controllable object after the control is performed.

FIG. 18A and FIG. 18B are conceptual diagrams illustrating an example of a movement control of the controllable object according to at least one embodiment of the present disclosure. FIG. 18A illustrates the controllable object before movement. FIG. 18B illustrates the controllable object after movement. The electric train OBJ that is a controllable object after movement is displayed in AR at a position different from the controllable object before the control of the controllable object control unit 12 is performed (before movement) in the field of view of the user.

Movement of the controllable object may be performed along the railway R, a road, or the like included in the augmented reality diorama or may be performed regardless of the railway R, the road, or the like included in the augmented reality diorama.

FIG. 19 is a conceptual diagram illustrating an example of an operation control of the controllable object according to at least one embodiment of the present disclosure. FIG. 19 illustrates a state after the controllable object control unit 12 controls an operation of the electric train OBJ that is a controllable object. FIG. 18A illustrates a state before the controllable object control unit 12 controls the operation of the electric train OBJ that is a controllable object. A door of the electric train OBJ closed in FIG. 18A is open in FIG. 19. That is, the controllable object control unit 12 controls the operation to open the door of the electric train OBJ.

FIG. 20 is a conceptual diagram illustrating an example of a state change control of the controllable object according to at least one embodiment of the present disclosure. FIG. 20 illustrates a state after the controllable object control unit 12 controls a state change of the electric train OBJ that is a controllable object. FIG. 18A illustrates a state before the controllable object control unit 12 controls the state change of the electric train OBJ that is a controllable object. While the electric train OBJ is formed with two cars in FIG. 18A, the electric train OBJ is formed with three cars by adding one car in FIG. 20. That is, the controllable object control unit 12 controls the state change such that the number of cars forming the electric train OBJ is increased.

Figure 21:
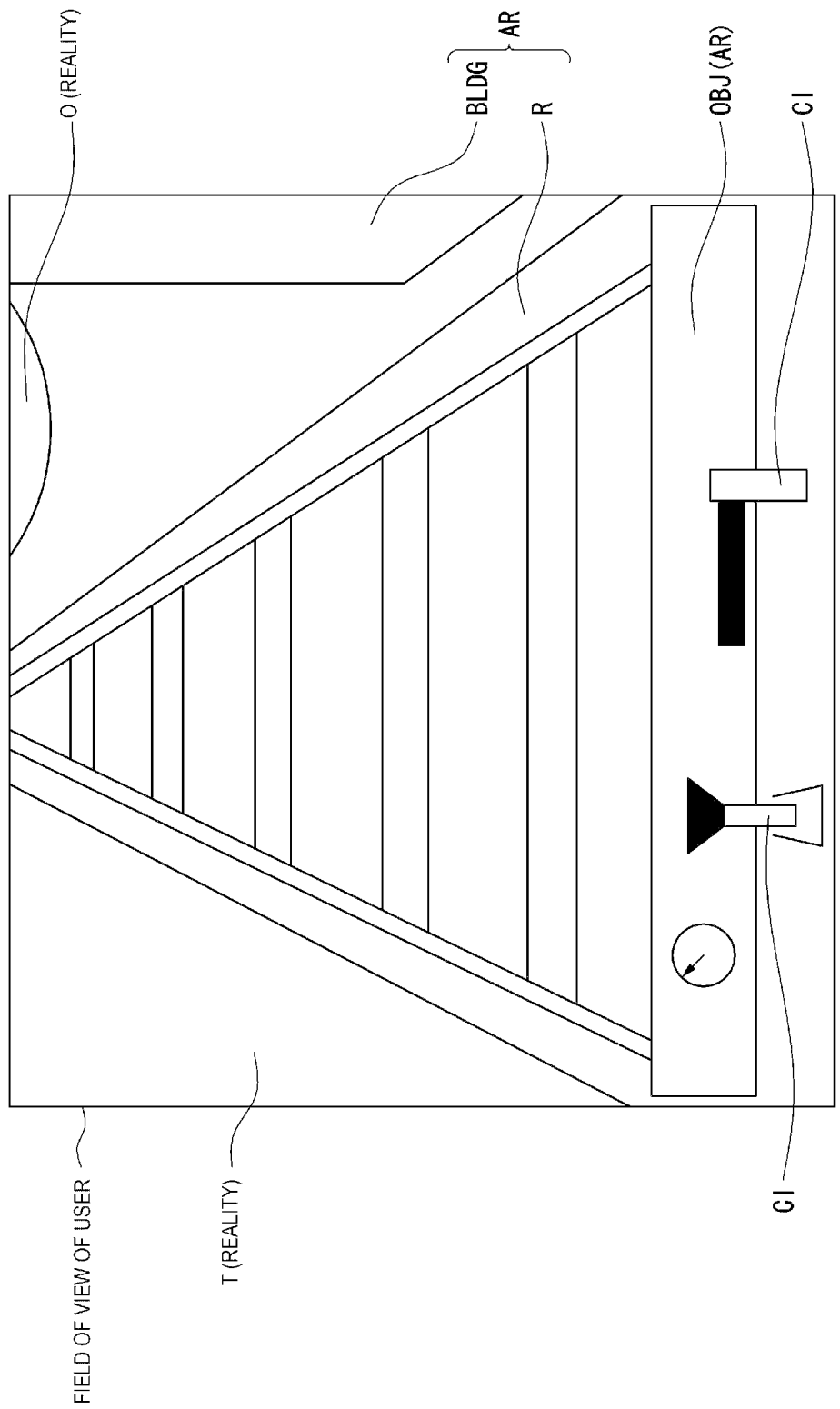
FIG. 21 is a diagram illustrating a display example by the display device according to at least one embodiment of the present disclosure.

FIG. 21 is a diagram illustrating a display example by the display device according to at least one embodiment of the present disclosure. A large rectangular frame in FIG. 21 is the same as in FIG. 15 and the like and thus, will not be described.

The controllable object display data output unit 11 may output display data for displaying, in a superimposed manner on the real space, the enlarged controllable object. For example, the controllable object may be enlarged to the same or similar size to the actual object (for example, the actual object of the automobile present in the real space) corresponding to the controllable object. For example, the controllable object may be enlarged to a size in which the user can board the controllable object. In addition, the controllable object may be enlarged to a desired size such that the user boarding the controllable object can be recognized. The augmented reality diorama display data output unit 13 may output display data for displaying, in a superimposed manner on the real space, the augmented reality diorama having a size corresponding to the size of the controllable object. The electric train OBJ that is an enlarged controllable object, and the railway R and the building BLDG that are augmented reality dioramas having sizes corresponding to the size of the electric train OBJ are displayed on the display device in a superimposed manner on the real space. Consequently, various elements as illustrated in FIG. 21 enter the field of view of the user.

The table T and the orange O placed on the table T enter the field of view of the user. The orange O and the table T are actual objects present in the real space.

The building BLDG and the railway R enter the field of view of the user. The building BLDG and the railway R are displayed in AR as augmented reality dioramas having sizes corresponding to the size of the electric train OBJ that is a controllable object.

The electric train OBJ enters the field of view of the user. The electric train OBJ is displayed in AR as the controllable object having an enlarged size.

Furthermore, the control interface CI for controlling the electric train OBJ that is a controllable object enters the field of view of the user. The control interface CI has a shape of a master controller that is a control apparatus included in an electric train in the real space. The electric train in the real space is an actual object corresponding to the electric train OBJ that is a controllable object. The controllable object display data output unit 11 may output the display data for displaying, for example, the control interface CI together with the electric train OBJ that is a controllable object.

The control interface CI may be displayed in AR on the display device included in the AR glasses or the like or may be normally displayed (not displayed in AR) on the display screen included in the mobile phone terminal 201 such as a smartphone.

The user provides the operation input by performing an operation such as tapping the displayed control interface CI (in a case of a user terminal including a touch panel) or performing a gesture of touching the control interface CI (in a case of AR glasses). As described above based on FIG. 14, the operation input information indicating the operation input is transmitted to the server 10Z from the user terminal 20. The controllable object control unit 12 controls at least one of the operation, movement, and the state change of the controllable object in accordance with the operation input information. As described above based on FIG. 14 and the like, the process may be repeated for the controllable object after the control in step St64 is performed. That is, after the controllable object control unit 12 performs the control, the controllable object display data output unit 11 may again output the display data of the controllable object after the control is performed.

With the above configuration, the user can have an experience of controlling the controllable object in a state where the user feels like boarding the controllable object displayed in AR. Accordingly, the user can enjoy both of a point of view of a controlling person and operability of the controllable object.

In addition, by displaying the augmented reality diorama having a size corresponding to the size of the controllable object, the user can have an experience of controlling the controllable object in a state where the user feels like entering the augmented reality diorama. Accordingly, the user can further enjoy both of the point of view of the controlling person and the operability of the controllable object.

A bird's-eye point-of-view mode in which the controllable object such as the electric train OBJ is seen in a bird's-eye view as illustrated in FIG. 15 to FIG. 20, and a controlling person point-of-view mode in which the controllable object such as the electric train OBJ is seen from the inside of the controllable object as illustrated in FIG. 21 may be switchable between each other. For example, in a case where the user taps the electric train OBJ displayed in AR in the bird's-eye point-of-view mode, the user may be notified of an option such as "Board? YES NO" by the display device, a voice output device or the like, and the bird's-eye point-of-view mode may be switched to the controlling person point-of-view mode based on a user selection. In addition, in a case where the user double-taps the electric train OBJ displayed in AR in the bird's-eye point-of-view mode, the bird's-eye point-of-view mode may be switched to the controlling person point-of-view mode. Besides, the bird's-eye point-of-view mode may be switched to the controlling person point-of-view mode based on various operation inputs such as a voice input or a gesture input, shaking or inclining the user terminal, or pinching out on the touch panel. Switching conversely from the controlling person point-of-view mode to the bird's-eye point-of-view mode may also be performed based on various operation inputs.

In addition, the bird's-eye point-of-view mode and the controlling person point-of-view mode may be seamlessly switched. For example, in a case where the user selects switching from the bird's-eye point-of-view mode to the controlling person point-of-view mode by performing an input operation as described above, the bird's-eye point-of-view mode may be switched to the controlling person point-of-view mode by gradually increasing the size of the electric train OBJ to a boardable size and gradually changing a size and a direction of the augmented reality diorama in accordance with the change in size of the electric train OBJ.

Next, examples of types of tactile presentation information will be described. As described above based on FIG. 14, the tactile presentation information output unit 14 outputs the tactile presentation information for driving the tactile presentation device based on at least one of the operation, movement, and the state change of the controllable object corresponding to the operation input provided by the user.

The tactile presentation information may be information representing a tactile sense that a person controlling the controllable object receives from the controllable object. For example, in a case where the controllable object is the electric train OBJ, the information representing the tactile sense that the person controlling the controllable object receives from the controllable object means information representing a tactile sensation (a feeling, a vibration, or the like) received by the user) from the master controller that is the control apparatus of the electric train. In a case where the controllable object is an automobile, information representing a tactile sensation received by the user from a steering wheel, an accelerator, a brake, a seat, or the like may be the tactile presentation information. In a case where the controllable object is an airplane or a ship, information representing a tactile sensation received by the user from a control stick, a helm, or the like may be the tactile presentation information.

The tactile presentation information may be information representing a tactile sense received by the controllable object from an outer world of the controllable object. The outer world means a world outside the controllable object. In a case where the controllable object moves in the augmented reality diorama, a built object, a road, and the like virtually arranged in the augmented reality diorama, and the actual object, a real built object, and the like present in the real space on which the controllable object is superimposed correspond to the outer world of the controllable object. In a case where the augmented reality diorama is not displayed, and the controllable object is displayed in AR, the actual object, the real built object, and the like present in the real space on which the controllable object is superimposed correspond to the outer world of the controllable object. For example, in a case where the controllable object is an animal such as a bird or a cat, the user controls movement, an operation, and the like of the animal. In this case, an impact or the like received when the animal runs and hits a wall is fed back to the user through the haptic device HPD in a state where, for example, strength of the impact is adjusted (attenuated or increased). Accordingly, the user can have an experience that feels like performing movement, an operation, and the like with the animal as a single body.

FIG. 22 is a conceptual diagram illustrating inter-apparatus communication according to at least one embodiment of the present disclosure.

A user A operates the user terminal 20A. A user B operates the user terminal 20B. The user terminals 20A and 20B are drawn as smartphones in FIG. 22 but may be other apparatuses.

The user A controls a controllable object OBJA by inputting the operation input information into the user terminal 20A. The user B controls a controllable object OBJB by inputting the operation input information into the user terminal 20B. Each of the user terminals 20A and 20B has a communication function of communicating with other apparatuses. The user A and the user B control the controllable objects while communicating with each other through the communication function provided in each of the user terminals 20A and 20B. For example, the user A and the user B fight against an enemy tank by controlling tanks while cooperating with allies present in the same battlefield in a game by communicating with the allies using voice chat. The above is merely an example, and the game is not limited to a game using tanks. In addition, a communication counterpart of the user is not limited to an allied user. For example, the user may communicate with a user on an enemy side.

The inter-apparatus communication unit 15 included in the server 10Z causes the user terminal 20A and the user terminal 20B to perform communication. More specifically, the inter-apparatus communication unit 15 relays communication between the user terminal 20A and the user terminal 20B through the communication network 30.

A form of communication among a plurality of terminals is typically voice chat. However, communication among the plurality of terminals may also be performed in a form other than voice chat. For example, the plurality of apparatuses may transmit and receive information about a chat using a text, a hand signal of the user, body language of the user, or the like by inter-terminal communication. For the hand signal and the body language of the user, a function of acquiring information indicating a physical operation of the user is provided in a user terminal on a transmission side. For example, this information may be acquired using a camera or the like. Besides, a hand signal or body language may be associated with an operation input, such as a push of a button included in a controller or a swipe operation on a smartphone screen, of the user terminal on the transmission side. In a user terminal on a reception side, information indicating a hand signal or body language may be displayed on the display device in a form of a hand signal, body language, or the like using an avatar. Besides, the user terminal on the reception side may display an icon, a mark, or the like corresponding to a hand signal or body language on the display device. The above is merely an example, and communication among the plurality of terminals may be performed in other forms.

The user operating the user terminal is typically a person but may be artificial intelligence capable of communicating with other persons. An autonomous conversation robot is an example of such artificial intelligence. In addition, the plurality of terminals may be three or more terminals.

When the user controls the controllable object, the inter-apparatus communication unit 15 causes the plurality of apparatuses to perform communication. The inter-apparatus communication unit 15 may cause the plurality of apparatuses to perform communication before or after the user controls the controllable object. Accordingly, the user can control the controllable object while communicating with other persons using the communication function.

The user terminals 20A and 20B may directly communicate with each other without the server 10Z.

As one aspect of the sixth embodiment, the display device displays the output display data, and the user can control the controllable object. Thus, the interest of the user can be improved.

As one aspect of the sixth embodiment, the display device displays the output display data, and the user can control the controllable object on the displayed augmented reality diorama. Thus, the interest of the user can be further improved.

As one aspect of the sixth embodiment, the display device displays the output display data, and the user can control the enlarged controllable object. Thus, the user can have an experience that feels like controlling the controllable object by boarding the controllable object, and the interest of the user can be further improved.

As one aspect of the sixth embodiment, by displaying the control interface for controlling the controllable object, the user can recognize that the object is controllable, and control the object. In addition, in a case where a vehicle, an animal, or the like that is an actual object corresponding to the controllable object is present in the real space, by displaying the control interface having the same shape as a control apparatus used in the vehicle, the animal, or the like or a shape resembling the control apparatus, the user can have a user experience that feels like actually controlling the vehicle or the animal. Thus, the interest of the user can be further improved.

As one aspect of the sixth embodiment, by driving the tactile presentation device based on at least one of the operation, movement, and the state change of the controllable object corresponding to the operation input provided by the user, the user can experience tactile feedback corresponding to the control of the user, and the interest of the user can be further improved.

As one aspect of the sixth embodiment, in a case where the tactile presentation information is information representing the tactile sense that the person controlling the controllable object receives from the controllable object, feedback about the tactile sense from the controllable object can be received in accordance with the control of the user. Thus, an immersive feeling is increased, and the interest of the user can be further improved.

As one aspect of the sixth embodiment, in a case where the tactile presentation information is information representing the tactile sense received by the controllable object from the outer world, the user can have an experience that feels like performing movement, an operation, and the like with the controllable object as a single body, and the interest of the user can be further improved.

As described above, each embodiment of the present application solves one or two or more deficiencies. Effects of each embodiment are non-limiting effects or an example of effects.

In each embodiment, the plurality of user terminals 20 and 201 to 204 and the server 10 execute the above various processes in accordance with various control programs (for example, the augmented reality processing program) stored in the respective storage devices thereof.

In addition, the configurations of the augmented reality processing system 100 and the augmented reality processing system 100A are not limited to the configurations described as an example of each embodiment. For example, a part or all of the processes described as a process executed by the user terminal may be configured to be executed by the server 10. A part or all of the processes described as a process executed by the server 10 may be configured to be executed by any of the plurality of user terminals 20 and 201 to 204.

In addition, a part or the entire storage unit (a storage medium or a storage device) included in the server 10 may be configured to be included in any of the plurality of user terminals 20 and 201 to 204. That is, a part or all of the functions included in any one of the user terminal and the server in the augmented reality processing system 100 or the augmented reality processing system 100A may be configured to be included in the other.

In addition, the program may be configured to implement a part or all of the functions described as an example of each embodiment in a single apparatus not including the communication network.

APPENDIX

The above description of the embodiments is disclosed in order for those of ordinary knowledge in the field of the disclosure to embody at least the following disclosure.

[1]
An augmented reality processing program causing a server to implement a controllable object display data output function of outputting display data for displaying, in a superimposed manner on a real space, a controllable object that is a virtual object controllable by a user, and a controllable object control function of controlling at least one of an operation, movement, and a state change of the controllable object in accordance with an operation input provided by the user.

[2]
The augmented reality processing program according to [1], further causing the server to implement an augmented reality diorama display data output function of outputting display data for displaying an augmented reality diorama in a superimposed manner on the real space.

[3]
The augmented reality processing program according to [1] or [2], in which in the controllable object display data output function, a function of outputting display data for displaying, in a superimposed manner on the real space, the enlarged controllable object is implemented.

[4]
The augmented reality processing program according to any one of [1] to [3], in which in the controllable object display data output function, a function of outputting display data for displaying a control interface for controlling the controllable object together with the controllable object is implemented.

[5]
The augmented reality processing program according to any one of [1] to [4], in which a tactile presentation information output function of outputting tactile presentation information for driving a tactile presentation device based on at least one of the operation, movement, and the state change of the controllable object corresponding to the operation input provided by the user is implemented.

[6]
The augmented reality processing program according to [5], in which the tactile presentation information is information representing a tactile sense that a person controlling the controllable object receives from the controllable object.

[7]
The augmented reality processing program according to [5], in which the tactile presentation information is information representing a tactile sense received by the controllable object from an outer world of the controllable object.

[8]

The augmented reality processing program according to any one of [1] to [7], further causing the server to implement an inter-apparatus communication function of causing a plurality of apparatuses to perform communication.

[9]

A program causing a user terminal capable of communicating with the server to implement at least one function of the functions that the server is caused to implement by the augmented reality processing program according to any one of [1] to [8].

[10]

A server on which the augmented reality processing program according to any one of [1] to [8] is installed.

[11]

An augmented reality processing system including a communication network, a server, a user terminal, and a display device, the augmented reality processing system including controllable object display data output means for outputting display data for displaying, in a superimposed manner on a real space, a controllable object that is a virtual object controllable by a user, display data display means for displaying the display data on the display device, and controllable object control means for controlling at least one of an operation, movement, and a state change of the controllable object in accordance with an operation input provided by the user.

[12]

An augmented reality processing program causing a user terminal to implement a controllable object display data output function of outputting display data for displaying, in a superimposed manner on a real space, a controllable object that is a virtual object controllable by a user, a display data display function of displaying the display data on a display device, and a controllable object control function of controlling at least one of an operation, movement, and a state change of the controllable object in accordance with an operation input provided by the user.

[13]

The augmented reality processing program according to [12], further causing the user terminal to implement a communication function of communicating with another apparatus.

[14]

A user terminal on which the augmented reality processing program according to [12] or [13] is installed.

[15]

An augmented reality processing method by a computer apparatus, the augmented reality processing method including a controllable object display data output process of outputting display data for displaying, in a superimposed manner on a real space, a controllable object that is a virtual object controllable by a user, and a controllable object control process of controlling at least one of an operation, movement, and a state change of the controllable object in accordance with an operation input provided by the user.

[16]

An augmented reality processing method by an augmented reality processing system including a communication network, a server, a user terminal, and a display device, the augmented reality processing method including a controllable object display data output process of outputting display data for displaying, in a superimposed manner on a real space, a controllable object that is a virtual object controllable by a user, a display data display process of displaying the display data on the display device, and a controllable object control process of controlling at least one of an operation, movement, and a state change of the controllable object in accordance with an operation input provided by the user.

INDUSTRIAL APPLICABILITY

One embodiment of the present disclosure is useful for improving the interest of the user.

What is claimed is:

1. A non-transitory computer readable medium storing an augmented reality processing program causing a server to perform functions comprising:
    outputting first display data of a virtual object to be superimposed on a view of a real space, the virtual object controllable by a user;
    outputting second display data of a control interface to be superimposed on the view of the real space together with the virtual object, the control interface resembling a control apparatus in the real space; and
    controlling at least one of an operation, movement, and a state change of the virtual object in accordance with an operation input by the user via the control interface superimposed on the view of the real space, wherein
    the functions further comprise switching between a bird's-eye point-of-view mode in which the virtual object is seen in a bird's-eye view and a controlling person point-of-view mode in which the virtual object is seen from inside of the virtual object.

2. The non-transitory computer readable medium according to claim 1, wherein the functions further comprise:
    outputting third display data of an augmented reality diorama superimposed on the view of the real space.

3. The non-transitory computer readable medium according to claim 1,
    wherein controlling the at least one of the operation, movement, and the state change of the virtual object comprises outputting the first display data of the virtual object enlarged and superimposed on the view of the real space.

4. The non-transitory computer readable medium according to claim 1, wherein the functions further comprise:
    outputting tactile presentation information for driving a tactile presentation device based on at least one of the operation, movement, and the state change of the virtual object corresponding to the operation input.

5. The non-transitory computer readable medium according to claim 4,
    wherein the virtual object is configured to provide the user with a tactile sense, and wherein the tactile presentation information is configured to represent the tactile sense.

6. The non-transitory computer readable medium according to claim 4,
    wherein the tactile presentation information is configured to represent a tactile sense received by the virtual object from an outer world of the virtual object.

7. The non-transitory computer readable medium according to claim 1, wherein the functions further comprise:
    causing a plurality of apparatuses to perform communication.

8. An augmented reality processing system comprising:
    a communication network;
    a server;
    a user terminal;
    a display device; and
    a computer in at least one of the server or the user terminal configured to:

output first display data of a virtual object to be superimposed on a view of a real space, the virtual object controllable by a user;

output second display data of a control interface to be superimposed on the view of the real space together with the virtual object, the control interface resembling a control apparatus in the real space;

display the first and second display data on the display device; and control at least one of an operation, movement, and a state change of the virtual object in accordance with an operation input by a user via the control interface superimposed on the view of the real space, wherein the computer is further configured to switch between a bird's-eye point-of-view mode in which the virtual object is seen in a bird's-eye view and a controlling person point-of-view mode in which the virtual object is seen from inside of the virtual object.

9. A non-transitory computer readable medium storing an augmented reality processing program causing a user terminal to perform functions comprising:

outputting first display data of a virtual object to be superimposed on a view of a real space, the virtual object controllable by a user;

outputting second display data of a control interface to be superimposed on the view of the real space together with the virtual object, the control interface resembling a control apparatus in the real space;

displaying the first and second display data on a display device; and controlling at least one of an operation, movement, and a state change of the virtual object in accordance with an operation input by the user via the control interface superimposed on the view of the real space, wherein the functions further comprise switching between a bird's-eye point-of-view mode in which the virtual object is seen in a bird's-eye view and a controlling person point-of-view mode in which the virtual object is seen from inside of the virtual object.

10. The non-transitory computer readable medium according to claim 1, wherein the first display data includes display data of the virtual object enlarged to a first size same as or similar to an actual object.

11. The non-transitory computer readable medium according to claim 10, wherein the functions further comprise outputting third display data of an augmented reality (AR) diorama to be superimposed on the view of the real space together with the virtual object and the control interface, the third display data including display data of the AR diorama having a second size corresponding to the first size of the virtual object.

12. The non-transitory computer readable medium according to claim 11, wherein the functions further comprise, when switching from the bird's-eye point-of-view mode to the controlling person point-of-view mode, gradually increasing the first size of the virtual object and gradually changing the second size of the AR diorama in accordance with the first size of the virtual object.

13. The non-transitory computer readable medium according to claim 12, wherein the functions further comprise gradually changing a direction of the AR diorama.

* * * * *